US011747811B1

(12) United States Patent
Cullinane et al.

(10) Patent No.: US 11,747,811 B1
(45) Date of Patent: Sep. 5, 2023

(54) ATTEMPTING TO PULL OVER FOR AUTONOMOUS VEHICLES

(71) Applicant: WAYMO LLC, Mountain View, CA (US)

(72) Inventors: Brian Douglas Cullinane, Palo Alto, CA (US); David Tse-Zhou Lu, Menlo Park, CA (US); Anne Kristiina Aula, Mountain View, CA (US); Jennifer Arden, Tiburon, CA (US); Nathaniel Fairfield, Mountain View, CA (US); Joshua Seth Herbach, San Francisco, CA (US); Calvin Karl Johnson, San Francisco, CA (US); Renaud-Roland Hubert, Gilroy, CA (US)

(73) Assignee: Waymo LLC, Mountain View, CA (US)

( * ) Notice: Subject to any disclaimer, the term of this patent is extended or adjusted under 35 U.S.C. 154(b) by 376 days.

(21) Appl. No.: 16/290,253

(22) Filed: Mar. 1, 2019

Related U.S. Application Data

(63) Continuation of application No. 15/278,419, filed on Sep. 28, 2016, now Pat. No. 10,261,512, which is a
(Continued)

(51) Int. Cl.
*G05D 1/02* (2020.01)
*B62D 15/02* (2006.01)
(Continued)

(52) U.S. Cl.
CPC .......... *G05D 1/0212* (2013.01); *B60R 25/24* (2013.01); *B60W 30/06* (2013.01);
(Continued)

(58) Field of Classification Search
USPC .......................................................... 701/26
See application file for complete search history.

(56) References Cited

U.S. PATENT DOCUMENTS 4,361,202 A 11/1982 Minovitch
4,465,155 A 8/1984 Collins
(Continued)

FOREIGN PATENT DOCUMENTS

CN 1470012 A 1/2004
CN 101421741 A 4/2009
(Continued)

OTHER PUBLICATIONS

Australian Examination Report No. 1 for Application No. 2018203456 dated Apr. 30, 2019.
(Continued)

*Primary Examiner* — Maceeh Anwari
(74) *Attorney, Agent, or Firm* — Botos Churchill IP Law

(57) ABSTRACT

Aspects of the present disclosure relate to a vehicle having one or more computing devices that may receive instructions to pick up a passenger at a pickup location and determine when the vehicle is within a first distance of the pickup location. When the vehicle is within the first distance, the computing devices may make a first attempt to find a spot to park the vehicle and wait for the passenger. When the vehicle is unable to find a spot to park the vehicle on the first attempt, the computing devices may maneuvering the vehicle in order to make a second attempt to find a spot to park the vehicle and wait for the passenger. When the vehicle is unable to find a spot to park the vehicle on the second attempt, the computing devices may stop the vehicle in a current lane to wait for the passenger.

20 Claims, 14 Drawing Sheets

Related U.S. Application Data continuation of application No. 14/549,977, filed on Nov. 21, 2014, now Pat. No. 9,547,307.

(60) Provisional application No. 62/002,319, filed on May 23, 2014.

(51) Int. Cl.

| | | |
|---|---|---|
| *B60W 30/06* | (2006.01) | |
| *G01C 21/20* | (2006.01) | |
| *G06Q 50/30* | (2012.01) | |
| *G06Q 10/1093* | (2023.01) | |
| *G01C 21/36* | (2006.01) | |
| *B60R 25/24* | (2013.01) | |
| *G01C 21/26* | (2006.01) | |
| *G07C 5/00* | (2006.01) | |
| *E05F 15/76* | (2015.01) | |
| *G01C 21/34* | (2006.01) | |
| *G05D 1/00* | (2006.01) | |
| *E05F 15/70* | (2015.01) | |
| *G06V 20/58* | (2022.01) | |
| *G08G 1/14* | (2006.01) | |

(52) U.S. Cl.
CPC .......... *B62D 15/0285* (2013.01); *E05F 15/70* (2015.01); *E05F 15/76* (2015.01); *G01C 21/20* (2013.01); *G01C 21/26* (2013.01); *G01C 21/3438* (2013.01); *G01C 21/362* (2013.01); *G01C 21/367* (2013.01); *G01C 21/3614* (2013.01); *G01C 21/3667* (2013.01); *G05D 1/0088* (2013.01); *G05D 1/0238* (2013.01); *G06Q 10/1095* (2013.01); *G06Q 50/30* (2013.01); *G06V 20/58* (2022.01); *G06V 20/586* (2022.01); *G07C 5/008* (2013.01); *B60W 2420/42* (2013.01); *B60W 2420/52* (2013.01); *B60W 2554/00* (2020.02); *B60W 2720/24* (2013.01); *E05Y 2800/426* (2013.01); *E05Y 2900/531* (2013.01); *G08G 1/14* (2013.01)

(56) References Cited

U.S. PATENT DOCUMENTS

| | | | |
|---|---|---|---|
| 5,293,160 A | 3/1994 | Kurozu et al. | |
| 5,367,456 A | 11/1994 | Summerville et al. | |
| 5,448,479 A | 9/1995 | Kemner et al. | |
| 5,640,323 A | 6/1997 | Kleimenhagen et al. | |
| 6,184,802 B1 | 2/2001 | Lamb | |
| 6,236,333 B1 | 5/2001 | King | |
| 6,298,304 B1 | 10/2001 | Theimer | |
| 6,356,820 B1 | 3/2002 | Hashimoto et al. | |
| 6,591,172 B2 | 7/2003 | Oda et al. | |
| 6,680,675 B1 | 1/2004 | Suzuki | |
| 6,697,730 B2 | 2/2004 | Dickerson | |
| 6,963,794 B2 | 11/2005 | Geber et al. | |
| 7,113,864 B2 | 9/2006 | Smith et al. | |
| 7,126,583 B1 | 10/2006 | Breed | |
| 7,859,386 B2 | 12/2010 | Lundkvist | |
| 7,928,829 B2 | 4/2011 | Hermann | |
| 8,044,771 B2 | 10/2011 | Nakajima et al. | |
| 8,078,349 B1 | 12/2011 | Prada Gomez et al. | |
| 8,126,450 B2 | 2/2012 | Howarter et al. | |
| 8,352,112 B2 | 1/2013 | Mudalige | |
| 8,494,765 B2 | 7/2013 | Konet et al. | |
| 8,532,862 B2 | 9/2013 | Neff | |
| 8,768,565 B2 | 1/2014 | Jefferies et al. | |
| 8,676,427 B1 | 3/2014 | Ferguson et al. | |
| 8,676,430 B1 | 3/2014 | Ferguson et al. | |
| 8,688,306 B1 | 4/2014 | Nemec et al. | |
| 8,718,861 B1 | 5/2014 | Montemerlo et al. | |
| 8,736,438 B1 | 5/2014 | Vasquez et al. | |
| 8,812,186 B2 | 8/2014 | Oh et al. | |
| 8,816,878 B2 | 8/2014 | Kadowaki et al. | |
| 8,880,270 B1 | 11/2014 | Ferguson et al. | |
| 8,935,034 B1 | 1/2015 | Zhu et al. | |
| 9,060,003 B2 | 6/2015 | Wang et al. | |
| 9,116,015 B2 | 8/2015 | Ishikawa et al. | |
| 9,156,476 B2 | 10/2015 | O'Neill et al. | |
| 9,191,514 B1 | 11/2015 | Cavanaugh et al. | |
| 9,194,168 B1 | 11/2015 | Lu et al. | |
| 9,304,513 B2 | 4/2016 | Ichikawa et al. | |
| 9,517,766 B2 | 12/2016 | Nakada et al. | |
| 9,523,984 B1 | 12/2016 | Herbach et al. | |
| 10,055,694 B2 | 8/2018 | Ichinose et al. | |
| 10,379,537 B1 | 8/2019 | Arden et al. | |
| 10,477,159 B1 | 11/2019 | Fredinburg et al. | |
| 10,795,355 B2 | 10/2020 | Nemec et al. | |
| 2004/0036622 A1 | 2/2004 | Dukach et al. | |
| 2004/0122570 A1 | 6/2004 | Sonoyama et al. | |
| 2004/0249569 A1 | 12/2004 | Oh | |
| 2004/0260470 A1 | 12/2004 | Rast | |
| 2005/0021227 A1* | 1/2005 | Matsumoto | G01C 21/3415 701/431 |
| 2005/0153707 A1 | 7/2005 | Ledyard et al. | |
| 2005/0227704 A1 | 10/2005 | Ferra et al. | |
| 2006/0253251 A1 | 11/2006 | Puranik et al. | |
| 2007/0073472 A1 | 3/2007 | Odinak et al. | |
| 2007/0073552 A1 | 3/2007 | Hileman | |
| 2007/0219720 A1 | 9/2007 | Trepagnier et al. | |
| 2008/0027590 A1 | 1/2008 | Phillips et al. | |
| 2008/0061931 A1 | 3/2008 | Hermann | |
| 2008/0136674 A1 | 6/2008 | Jang et al. | |
| 2008/0195428 A1 | 8/2008 | O'Sullivan | |
| 2008/0266139 A1 | 10/2008 | Kim | |
| 2008/0312817 A1 | 12/2008 | Kawauchi | |
| 2009/0037033 A1 | 2/2009 | Phillips et al. | |
| 2009/0140994 A1 | 6/2009 | Tanaka et al. | |
| 2009/0156241 A1* | 6/2009 | Statfaroni | G06Q 10/08 455/466 |
| 2009/0171566 A1 | 7/2009 | Morimoto et al. | |
| 2009/0187538 A1 | 7/2009 | Grun | |
| 2009/0216600 A1 | 8/2009 | Hill | |
| 2009/0248231 A1 | 10/2009 | Tsuyoshi | |
| 2009/0287367 A1 | 11/2009 | Salinger | |
| 2010/0007525 A1 | 1/2010 | Shanbhag et al. | |
| 2010/0017084 A1 | 1/2010 | Riegel | |
| 2010/0070168 A1 | 3/2010 | Sumcad et al. | |
| 2010/0106397 A1 | 4/2010 | Van | |
| 2010/0075656 A1 | 5/2010 | Howarter et al. | |
| 2010/0117585 A1 | 5/2010 | Fitch et al. | |
| 2010/0183409 A1 | 7/2010 | Checketts et al. | |
| 2010/0256836 A1 | 10/2010 | Mudalige | |
| 2010/0284771 A1 | 11/2010 | Stierler | |
| 2010/0286845 A1 | 11/2010 | Rekow et al. | |
| 2011/0099040 A1 | 4/2011 | Felt et al. | |
| 2011/0112969 A1 | 5/2011 | Zaid et al. | |
| 2011/0144865 A1 | 6/2011 | Niemz | |
| 2011/0144980 A1 | 6/2011 | Rysenga | |
| 2011/0191019 A1 | 8/2011 | Holsinger et al. | |
| 2011/0301985 A1 | 12/2011 | Camp et al. | |
| 2012/0041675 A1 | 2/2012 | Juliver et al. | |
| 2012/0072051 A1 | 3/2012 | Koon | |
| 2012/0083959 A1 | 4/2012 | Dolgov et al. | |
| 2012/0083960 A1 | 4/2012 | Zhu et al. | |
| 2012/0083964 A1 | 4/2012 | Montemerlo et al. | |
| 2012/0173080 A1 | 7/2012 | Cluff | |
| 2012/0188100 A1 | 7/2012 | Min et al. | |
| 2012/0271500 A1 | 10/2012 | Tsimhoni et al. | |
| 2013/0024049 A1* | 1/2013 | Yoshioka | B62D 1/00 701/2 |
| 2013/0110342 A1* | 5/2013 | Wuttke | B62D 15/027 701/23 |
| 2013/0231824 A1* | 9/2013 | Wilson | G01C 21/3415 701/26 |
| 2013/0238783 A1 | 9/2013 | Alexander et al. | |
| 2013/0289825 A1 | 10/2013 | Noh et al. | |
| 2013/0321178 A1 | 12/2013 | Jameel et al. | |
| 2014/0052312 A1 | 2/2014 | Stadler | |
| 2014/0135598 A1 | 5/2014 | Weidl et al. | |
| 2014/0156182 A1 | 6/2014 | Nemec et al. | |

(56) References Cited

U.S. PATENT DOCUMENTS

| | | | |
|---|---|---|---|
| 2014/0172292 | A1 | 6/2014 | Mcgee et al. |
| 2014/0172727 | A1 | 6/2014 | Abhyanker et al. |
| 2014/0189096 | A1 | 7/2014 | Miller et al. |
| 2014/0285361 | A1 | 9/2014 | Tippelhofer et al. |
| 2014/0350855 | A1* | 11/2014 | Vishnuvajhala ...... G07F 17/246 701/538 |
| 2014/0358353 | A1 | 12/2014 | Ibanez-Guzman et al. |
| 2014/0365250 | A1 | 12/2014 | Ikeda et al. |
| 2014/0380424 | A1 | 12/2014 | Thompson |
| 2015/0073645 | A1 | 3/2015 | Davidsson et al. |
| 2015/0081362 | A1 | 3/2015 | Chadwick et al. |
| 2015/0127191 | A1 | 5/2015 | Misra et al. |
| 2015/0148989 | A1 | 5/2015 | Cooper et al. |
| 2015/0149320 | A1 | 5/2015 | Smirin |
| 2015/0172894 | A1 | 6/2015 | Gabel |
| 2015/0185034 | A1 | 7/2015 | Abhyanker |
| 2015/0219464 | A1 | 8/2015 | Beaurepaire et al. |
| 2015/0279210 | A1* | 10/2015 | Zafiroglu ............... G08G 1/065 340/932.2 |
| 2015/0321641 | A1 | 11/2015 | Abou Mahmoud et al. |
| 2015/0324708 | A1 | 11/2015 | Skipp et al. |
| 2015/0334187 | A1 | 11/2015 | Pesola et al. |
| 2015/0338849 | A1 | 11/2015 | Nemec et al. |
| 2015/0339928 | A1 | 11/2015 | Ramanujam |
| 2015/0369621 | A1 | 12/2015 | Abhyanker |
| 2015/0370251 | A1 | 12/2015 | Siegel et al. |
| 2016/0019790 | A1 | 1/2016 | Tobolski et al. |
| 2016/0027307 | A1 | 1/2016 | Abhyanker et al. |
| 2016/0042303 | A1 | 2/2016 | Medina et al. |
| 2016/0116293 | A1 | 4/2016 | Grover et al. |
| 2016/0125735 | A1 | 5/2016 | Tuukkanen |
| 2016/0148514 | A1 | 5/2016 | Iwami et al. |
| 2016/0170410 | A1 | 6/2016 | Ichikawa et al. |
| 2016/0203377 | A1 | 7/2016 | Irie et al. |
| 2016/0221495 | A1 | 8/2016 | Cunningham, III et al. |
| 2016/0301698 | A1 | 10/2016 | Katara et al. |
| 2016/0318518 | A1 | 11/2016 | Suzuki et al. |
| 2016/0327949 | A1 | 11/2016 | Wilson et al. |
| 2016/0349751 | A1 | 12/2016 | Sugimoto |
| 2017/0075358 | A1 | 3/2017 | Zhang |
| 2018/0017969 | A1 | 1/2018 | Nagy et al. |

FOREIGN PATENT DOCUMENTS

| | | |
|---|---|---|
| CN | 101971116 A | 2/2011 |
| CN | 102460535 A | 5/2012 |
| CN | 102939230 A | 2/2013 |
| CN | 103339010 A | 10/2013 |
| CN | 103587504 A | 2/2014 |
| DE | 102005049380 A1 | 4/2007 |
| DE | 102009033752 A1 | 1/2011 |
| EP | 2573720 A1 | 3/2013 |
| EP | 2629269 A1 | 8/2013 |
| JP | S60202621 A | 10/1985 |
| JP | H07277160 A | 10/1995 |
| JP | H08161046 A | 6/1996 |
| JP | H08244494 A | 9/1996 |
| JP | H11-208497 A | 8/1999 |
| JP | 2001-234653 A | 8/2001 |
| JP | 2002178795 A | 6/2002 |
| JP | 2003195941 A | 7/2003 |
| JP | 2003205807 A | 7/2003 |
| JP | 2003256046 A | 9/2003 |
| JP | 2004171041 A | 6/2004 |
| JP | 2006040683 A | 2/2006 |
| JP | 3759979 B2 | 3/2006 |
| JP | 2007268086 A | 10/2007 |
| JP | 2011226441 A | 11/2011 |
| JP | 2013238182 A | 11/2013 |
| JP | 2014019301 A | 2/2014 |
| WO | 03080391 A2 | 10/2003 |
| WO | 20110158347 A1 | 12/2011 |
| WO | 2013117205 A1 | 8/2013 |
| WO | 2015169204 A1 | 11/2015 |

OTHER PUBLICATIONS

Japanese Office Action for Application No. 2018200550 dated Aug. 26, 2019.

Japanese Office Action for Application No. JP2016-563820 dated Sep. 18, 2019.

"Extended European Search Report received for European Patent Application No. 18156156.4, dated Mar. 28, 2018", 6 pages.

"Federal Transit Administration, Topic Guides on ADA Transportation—Topic Guide 6, On-Time Performance", <htlp:/ /dredf .org/ ADA!g/OTP.shtml>, Jul. 2011.

"Federal Transit Administration, Topic Guides on ADA Transportation—Topic Guide 7, No. Shows", <http:/ /dredf .org/ADAtg/noshow.shtml>, Jul. 2011.

"International Search Report and Written Opinion for PCT Application No. PCT/US2016/035977 dated Sep. 29, 2016.", Sep. 29, 2016, 12 pages.

Examination Report No. 1 for Australian Patent Application No. 2015263981 dated Aug. 25, 2017. 7 pages.

Examination Report No. 2 for Australian Patent Application No. 2015263981 dated Nov. 8, 2017. 8 pages.

Examination Report No. 3 for Australian Patent Application No. 2015263981 dated Jan. 29, 2018. 9 pages.

Examiner's Report for Canadian Patent Application No. 2,947,995 dated Sep. 14, 2017. 4 pages.

Examiner's Report for Canadian Patent Application No. 2,947,995, dated Jun. 4, 2018. 4 pages.

Australian Examination Report No. 2 for Australian Application No. 2018203456, dated Sep. 26, 2019.

Extended European Search Report for European Application No. 19193841, dated Dec. 13, 2019.

Korean Office Action for Application No. 10-2019-7023148 dated Nov. 20, 2019.

Japanese Office Action for Application No. 2018200550 dated Nov. 29, 2019.

"Notice of Allowance in CN Application No. 201580023657.2, dated Sep. 27, 2019", 4 pages (2 pages of English Translation and 2 pages of Official copy).

"Extended European Search Report received for European Patent Application No. 15796123.6, dated Mar. 8, 2018", 6 pages.

"First Office Action received for Chinese Patent Application No. 201580023657.2", dated Jul. 27, 2018, 21 pages (10 pages of English Translation and 11 pages of Official copy).

"International Search Report and Written Opinion received for PCT Patent Application No. PCT/US2015/032171, dated Sep. 17, 2015", dated Sep. 17, 2015, 13 pages.

"International Search Report and Written Opinion received for PCT Patent Application No. PCT/US2015/032181, dated Sep. 4, 2015", dated Sep. 4, 2015, 12 pages.

"North Las Vegas—Code of Ordinance", Available Online at <https:lllibrary.municode.com/nv/north_las_vegas/codes/code_of_ordinances/196159?nodeId=TIT1 OVETR_ CH1 0.48STSTPAGE_1 0.48.180STPACULOZO>, May 21, 2013, 13 pages.

"Notice of Reasons for Rejection received for Japanese Patent Application No. 2016-563820", dated Feb. 16, 2018, 11 pages ( 6 pages of English Translation and 5 pages of Official copy).

"U.S. Appl. No. 61/391,271, filed Oct. 8, 2010.", 63 pages.

Baydere , et al., "MR 302: The Future of the Automobile: Car-Sharing Service using Autonomous Automobiles", Spring 2014, 2014, pp. 1-10.

BLUETOOTH® Keyless , "FAQs about the Bluetooth® Passive Keyless Entry Module", downloaded from <http://bluetoothkeyless.info/bluetooth-keyless-information/>, 2014, 3 pages.

Chevrolet , "OnStar Remote Link™: Control you Chevy even when you're not driving it", Available online at : <http://www.chevrolet.com/onstar-remotelink.html>, 2014, 2 pages.

Fagnant , et al., "The travel and environmental implications of shared autonomous vehicles, using agent-based model scenarios", Transportation Research Part C, vol. 40 {2014) : 1-13, 2014, pp. 1-13 (The attached Reference includes 22 pages).

Goodwin, Antuan , "Add-on module auto-unlocks your car when your phone is near", clnet, Available online at : <http://www.cnet.

(56) References Cited

OTHER PUBLICATIONS com/news/add-on-rnodule-auto-unlocks-your-car-when-your-phone-is-near/>., Nov. 19, 2013, 5 pages.

Jaffe, Eric, "The First Look at How Google's Self-Driving Car Handles City Streets—Citylab", Available at <https:jjwww.citylab.com/life/2014/04/first-lookhow-googles-self-driving-car -handles-city-streets/8977/>, Apr. 28, 2014, 1-18 pages.

Junqing Wei, et al., "Towards a viable autonomous driving research platform", In: Intelligent Vehicles Symposium (IV), 2013 IEEE, Jun. 23-26, 2013, pp. 763-770.

Mcfadden, Colin-Druce, "Autonomous car concept swaps steering wheel for gesture controls", Available online at : <http://www.dvice.com/2014-3-12/autonomous-car-concept-swaps-steering-wheel-gesture-controls>, Mar. 12, 2014, 4 pages.

Mckeegan, Noel, "Autonomous taxi can be hailed with and iPad app", Available online at : <http://www.gizmag.com/autonomous-taxi-ipad/16649/>, Oct. 14, 2010, 2 pages.

Quora, et al., "In Between Rides, Is it in an Uber (Company) Drive's Best Interest to Stay Put or Drive Around?", Quora.com—A Place to share knowledge and better understand the world. Available online at < https://www.quora.com/Inbetween-rides-is-it-in-an-Uber-company-drivers-best -interest-to-stay-put-or -drive-around>, Feb. 25, 2014, 2 pages.

Ranoa, Raoul, "Infographic:The car that drives itself", Los Angeles Times, copyright 2014, Available online at <https://www.latimes.com/local/lanow/la-sci-g-google-self-driving-car-20140528-htmlstory.html>, 2014, 5 pages.

Ridden, Paul, "ATNMBL—the concept car with no steering wheel, brake pedal or driver's seat", Available online at : <http://www.gizmag.com/atnmbl-autonomous-concept-passenger-transport/15877/>, Jul. 29, 2010, 3 pages.

Schwarz, et al., "Towards Autonomous Vehicles", University of Nebraska-Lincoln. Final Reports & Technical Breifs from Mid-America Transportation center. Reort# MATC-UI:117, Available Online at <http://digitalcommons.unl.edu/cgi/viewcontent.cgi?article=1 092&context=matcreports>., Dec. 2013, 79 pages.

uberpeople.net, "How Long Do You Wait? Post Your Times", UberPeople.NET—Independent Community of Rideshare Drivers, Available Online at <https://uberpeople.netlthreads/how-long-do-you-wait-post-your-times.2162/>, Aug. 20, 2014, 5 pages.

uberpeople.net, "Wait Time for Riders", UberPeople.NET—Independent Community of Rideshare Drivers. Available Online at < https://uberpeople.net/threads/wait-time-for-riders.2441 >, May 12, 2014, 7 pages.

EPO Examination Report in Application No. 19193841.4, dated Jan. 27, 2021.

Decision to Grant from the Japan Patent Office for Application No. JP2018-200550 dated Mar. 6, 2020.

The First Office Action for Chinese Patent Application No. 201911239662.3, dated Nov. 11, 2022.

Chung, You Chung, et al., "Wireless Safety Personnel Radio Device for Collision Avoidance System of Autonomous Vehicles", 2002, IEEE Antennas and Propagation Society International Symposium, pp. 121-124.

Cui, Qiang, et al., "Design and Realization of Autopilot ATS Based on PXIe", AVIC Aeronautical Computing Technique Research Institute, 2013, pp. 32-38.

* cited by examiner

ATTEMPTING TO PULL OVER FOR AUTONOMOUS VEHICLES

CROSS REFERENCE TO RELATED APPLICATIONS

The present application is a continuation of U.S. patent application Ser. No. 15/278,419 filed on Sep. 28, 2016, which is a continuation of U.S. patent application Ser. No. 14/549,977, filed on Nov. 21, 2014, now U.S. Pat. No. 9,547,307, issued on Jan. 17, 2017 which claims the benefit of the filing date of U.S. Provisional Patent Application No. 62/002,319 filed May 23, 2014, the disclosures of which are hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a destination, and the vehicle maneuvers itself to that destination.

BRIEF SUMMARY

One aspect of the disclosure provides a method. The method includes receiving, by one or more computing devices, instructions to pick up a passenger at a pickup location for a trip; determining, by the one or more computing devices, when the vehicle is within a first distance of the pickup location; when the vehicle is within the first distance, making a first attempt, by the one or more computing devices, to find a spot to park the vehicle and wait for the passenger within the first distance of the first location; when the vehicle is unable to find a spot to park the vehicle on the first attempt, maneuvering, by the one or more computing devices, the vehicle in order to make a second attempt to find a spot to park the vehicle and wait for the passenger; and when the vehicle is unable to find a spot to park the vehicle on the second attempt, stopping, by the one or more computing devices, the vehicle in a current lane to wait for the passenger.

In one example, the method also includes, before maneuvering the vehicle in order to make the second attempt, attempting, by the one or more computing devices, to detect and identify a client computing device associated with the passenger, and maneuvering the vehicle in order to make the second attempt occurs after the one or more computing devices are unable to detect and authenticate the client computing device. In another example, the method also includes before stopping the vehicle in the current lane to wait for the passenger, attempting, by the one or more computing devices, to detect and identify a client computing device associated with the passenger, and stopping the vehicle in a current lane to wait for the passenger occurs after the one or more computing devices are able to detect and authenticate the client computing device. In another example, the method also includes sending, by the one or more computing devices, a notification to a client computing device associated with the passenger indicating that the vehicle can stop in the current lane to wait for the passenger. In this example, the method also includes receiving, by the one or more computing devices, confirmation that the passenger will meet the vehicle in the current lane. In another example, the method also includes, before stopping the vehicle in a current lane to wait for the passenger, determining, by the one or more computing devices, that the vehicle can stop and wait in the current lane for the passenger. In another example, making the first attempt includes attempting to find a parking spot outside of any traffic lane. In another example, the method also includes, before maneuvering the vehicle in order to make a second attempt, stopping the vehicle at the pickup location for a predetermined period of time to wait for the passenger.

Another aspect of the disclosure provides a system including one or more computing devices. The one or more computing devices are configured to receive instructions to pick up a passenger at a pickup location for a trip; determine when the vehicle is within a first distance of the pickup location; when the vehicle is within the first distance, make a first attempt to find a spot to park the vehicle and wait for the passenger within the first distance of the first location; when the vehicle is unable to find a spot to park the vehicle on the first attempt, maneuver the vehicle in order to make a second attempt to find a spot to park the vehicle and wait for the passenger; and when the vehicle is unable to find a spot to park the vehicle on the second attempt, stop the vehicle in a current lane to wait for the passenger.

In one example, the one or more computing devices are also configured to, before maneuvering the vehicle in order to make the second attempt, attempt to detect and identify a client computing device associated with the passenger, and to maneuver the vehicle in order to make the second attempt after the one or more computing devices are unable to detect and authenticate the client computing device. In another example, the one or more computing devices are also configured to, before stopping the vehicle in the current lane to wait for the passenger, attempt to detect and identify a client computing device associated with the passenger, and to stop the vehicle in a current lane to wait for the passenger after the one or more computing devices are able to detect and authenticate the client computing device. In one example, the one or more computing devices are also configured to send a notification to a client computing device associated with the passenger indicating that the vehicle can stop in the current lane to wait for the passenger. In this example, the one or more computing devices are also configured to receive confirmation that the passenger will meet the vehicle in the current lane. In one example, the one or more computing devices are also configured to, before stopping the vehicle in a current lane to wait for the passenger, determine that the vehicle can stop and wait in the current lane for the passenger. In one example, the one or more computing devices are also configured to make the first attempt by attempting to find a parking spot outside of any traffic lane. In one example, the one or more computing devices are also configured to, before maneuvering the vehicle in order to make a second attempt, stop the vehicle at the pickup location for a predetermined period of time to wait for the passenger. In another example, the system also includes the vehicle.

A further aspect of the disclosure provides a non-transitory computer-readable medium on which instructions are stored. The instructions, when executed by one or more processors cause the one or more processors to perform a method. The method includes receiving instructions to pick up a passenger at a pickup location for a trip; determining when the vehicle is within a first distance of the pickup location; when the vehicle is within the first distance, making a first attempt to find a spot to park the vehicle and wait for the passenger within the first distance of the first location; when the vehicle is unable to find a spot to park the vehicle on the first attempt, maneuvering the vehicle in order to make a second attempt to find a spot to park the vehicle and wait for the passenger; and when the vehicle is unable to find a spot to park the vehicle on the second attempt, stopping the vehicle in a current lane to wait for the passenger.

In one example, the method includes, before maneuvering the vehicle in order to make the second attempt, attempt to detect and identify a client computing device associated with the passenger, and maneuvering the vehicle in order to make the second attempt occurs after the one or more processors are unable to detect and authenticate the client computing device. In another example, the method further includes, before stopping the vehicle in the current lane to wait for the passenger, attempting to detect and identify a client computing device associated with the passenger, and stopping the vehicle in a current lane to wait for the passenger occurs after the one or more processors are able to detect and authenticate the client computing device.

DETAILED DESCRIPTION

Overview

Figure 1:
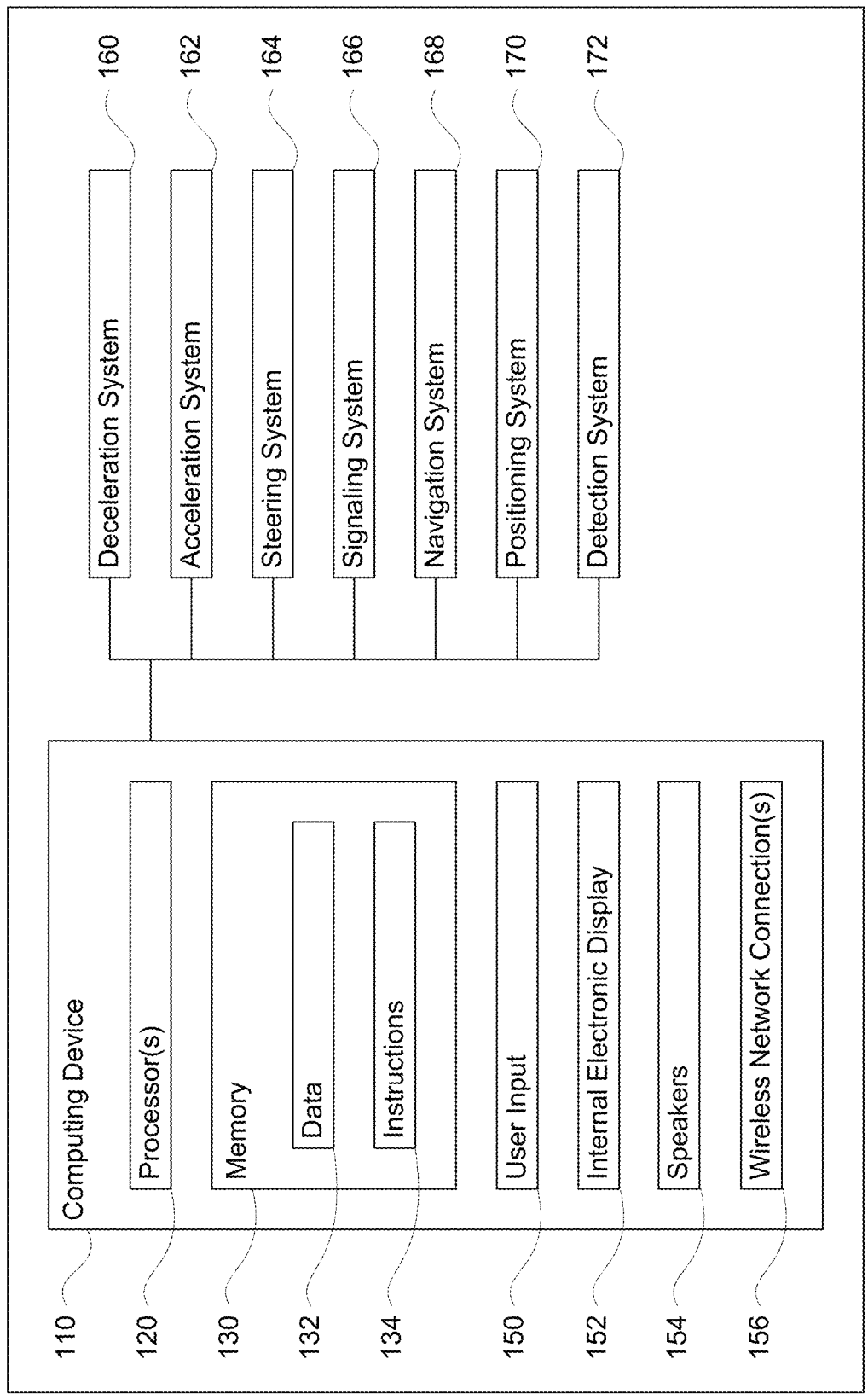
FIG. 1 is a functional diagram of an example vehicle in accordance with an exemplary embodiment.

The technology relates to autonomous vehicle for maneuvering a user or passenger to a destination, for example taking a trip, autonomously. In order to do so, the user may provide a pickup location and a destination location for the trip to a centralized dispatching system via a client computing device, such as a mobile phone. The centralized dispatching system may then dispatch a vehicle to the pickup location. However, once the vehicle has arrived at the pickup and destination locations, the vehicle must find a safe place to stop.

For example, once a vehicle is dispatched to a pickup location, the vehicle may maneuver itself to the pickup location and subsequently the destination location. Once the vehicle is within some distance in time or space to the pickup or destination location, the vehicle's computing devices may attempt to look for a spot in which the vehicle can stop and wait for the passenger. This may involve simply identifying an area long and wide enough for the vehicle to maneuver out of a lane and onto a shoulder or parking spot. In some examples, because the vehicle will likely not be waiting for a long period of time, the vehicle may stop in front of a driveway or no parking zone.

In some instances, the vehicle's computing devise may not be able to identify a suitable stopping location. When this is the case, the vehicle's computing devices may take various actions. In a first example for a pickup location, the vehicle may simply attempt to "drive around the block" and return to the pickup location a second time. As with the first attempt to find a spot, the vehicle may attempt to identify a spot within some time or distance of the pickup location. If this second attempt to find a spot is unsuccessful, the vehicle's computing devices may simply cancel the trip and notify the passenger's mobile phone. Alternatively, rather than making the second attempt, the vehicle may come to a stop at the pickup location for a brief period, to see if the passenger can meet the vehicle.

As another alternative, during the second attempt if the vehicle's computing devices are unable to find a spot, the vehicle may simply stop at the pickup location in the lane. Because such stopping can be dangerous or inconvenient for other drivers, this more aggressive approach may be reserved for locations where stopping would be considered safe, such as in slower speed zones or where there is less traffic.

In some examples, while the vehicle's computing devices are attempting to find a spot in order to pick up a passenger, the vehicle's computing devices may also attempt to detect and authenticated the passenger's mobile phone. When unsuccessful, the vehicle's computing devices may use this as a trigger to drive the vehicle around the block to make the second attempt. In this regard, rather than driving around the block and making a second attempt to pull the vehicle over when the mobile phone has been detected and authenticated during the first attempt, the vehicle's computing devices may simply stop the vehicle in the lane at the pickup location. In this case, the vehicle may unlock the doors after a brief period and wait for the passenger to enter.

Rather than cancelling a trip, the vehicle may attempt to work with the passenger to conduct the pickup "on the fly." As an example, the vehicle's computing devices may be able to find a spot within some distance after passing the pickup location. If so, the vehicle's computing devices may send a notification about the new location and asking the passenger if he or she is willing to walk to the vehicle and thus, complete the pickup in this manner. In another example, when the vehicle is making a first or a second attempt to stop but is unable to find a spot, the vehicle's computing devices may send a notification to the passenger asking if the passenger is willing to enter the vehicle quickly while the vehicle is stopped in a lane, commonly known as being double parked. Again, if so, the vehicle and passenger may complete the pickup in this manner.

While the features discussed above may also be used to implement a drop off of a passenger, because less time is likely to be needed for a passenger to exit the vehicle than to enter and begin a trip, the vehicle's computing devices may be more aggressive when attempting to find a spot or stop the vehicle in a traffic lane.

The features described above provide for a safe and practical way for an autonomous vehicle to stop, pickup a passenger, and drop off a passenger. Using a combination of different strategies may also allow the vehicle to respond appropriately in a number of different situations and provide a better user experience.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 154 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may be capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and detection system 172 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The detection system 172 also includes one or more components for detecting objects external to the vehicle such as other vehicles, obstacles in the roadway, traffic signals, signs, trees, etc. For example, the detection system 170 may include lasers, sonar, radar, cameras and/or any other detection devices that record data which may be processed by computing device 110. In the case where the vehicle is a small passenger vehicle such as a car, the car may include a laser or other sensors mounted on the roof or other convenient location.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and detection system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computing device 110 may also control the drivetrain of the vehicle in order to maneuver the vehicle autonomously.

Figure 2:
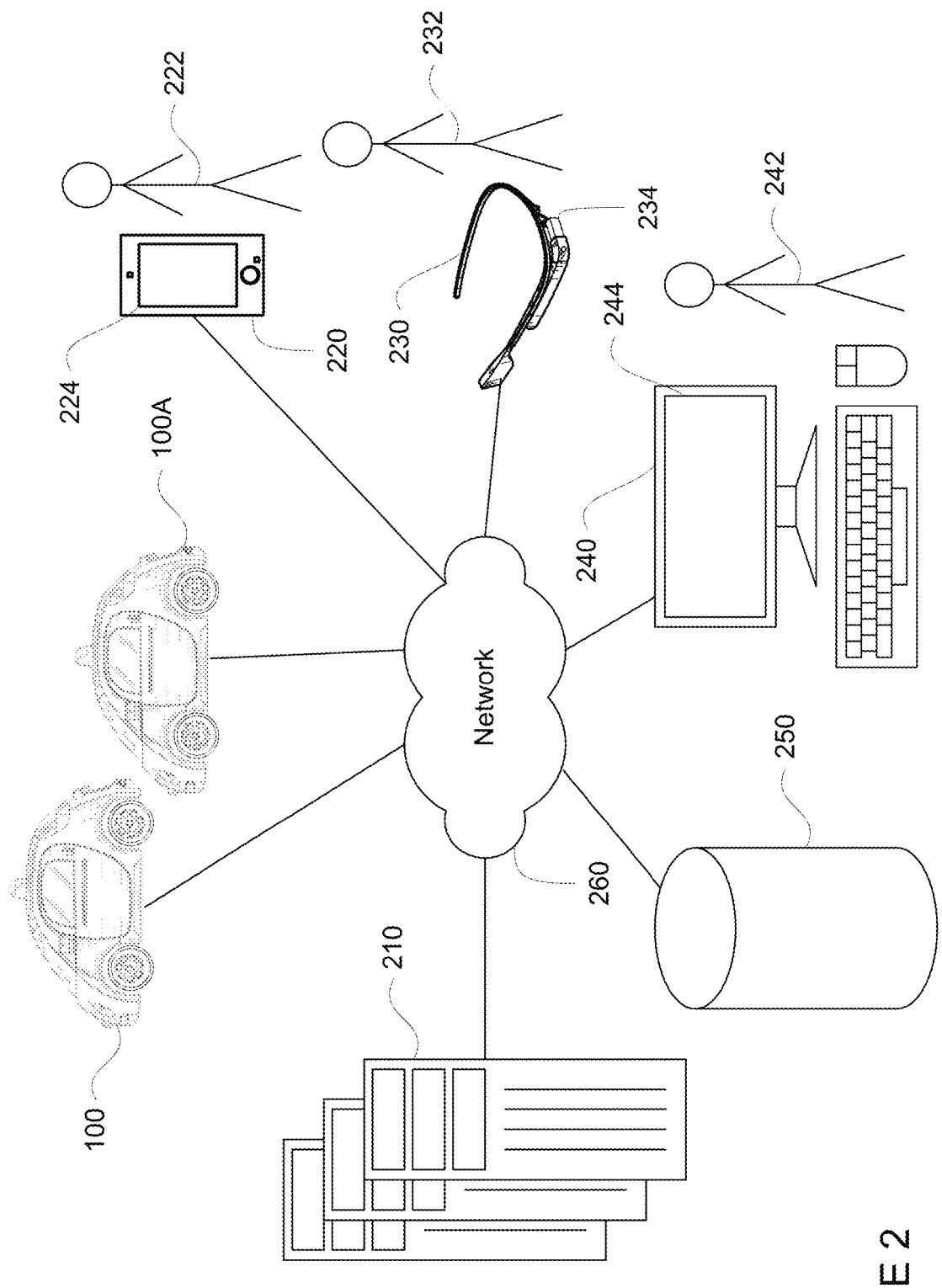
FIG. 2 is a functional diagram of an example system in accordance with an exemplary embodiment.
Figure 3:
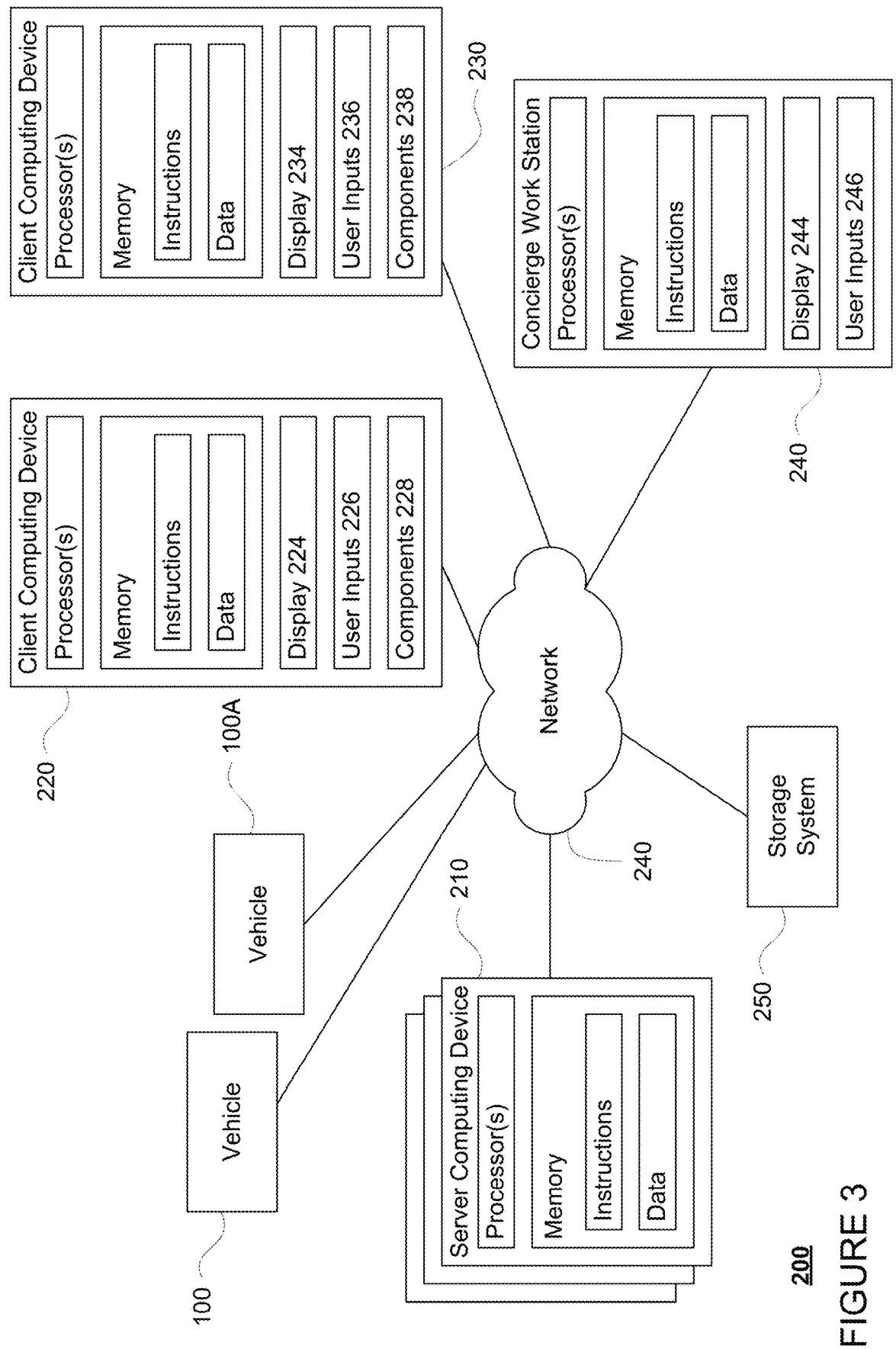
FIG. 3 is a pictorial diagram of the system of FIG. 2 in accordance with aspects of the disclosure.
Figure 4A:
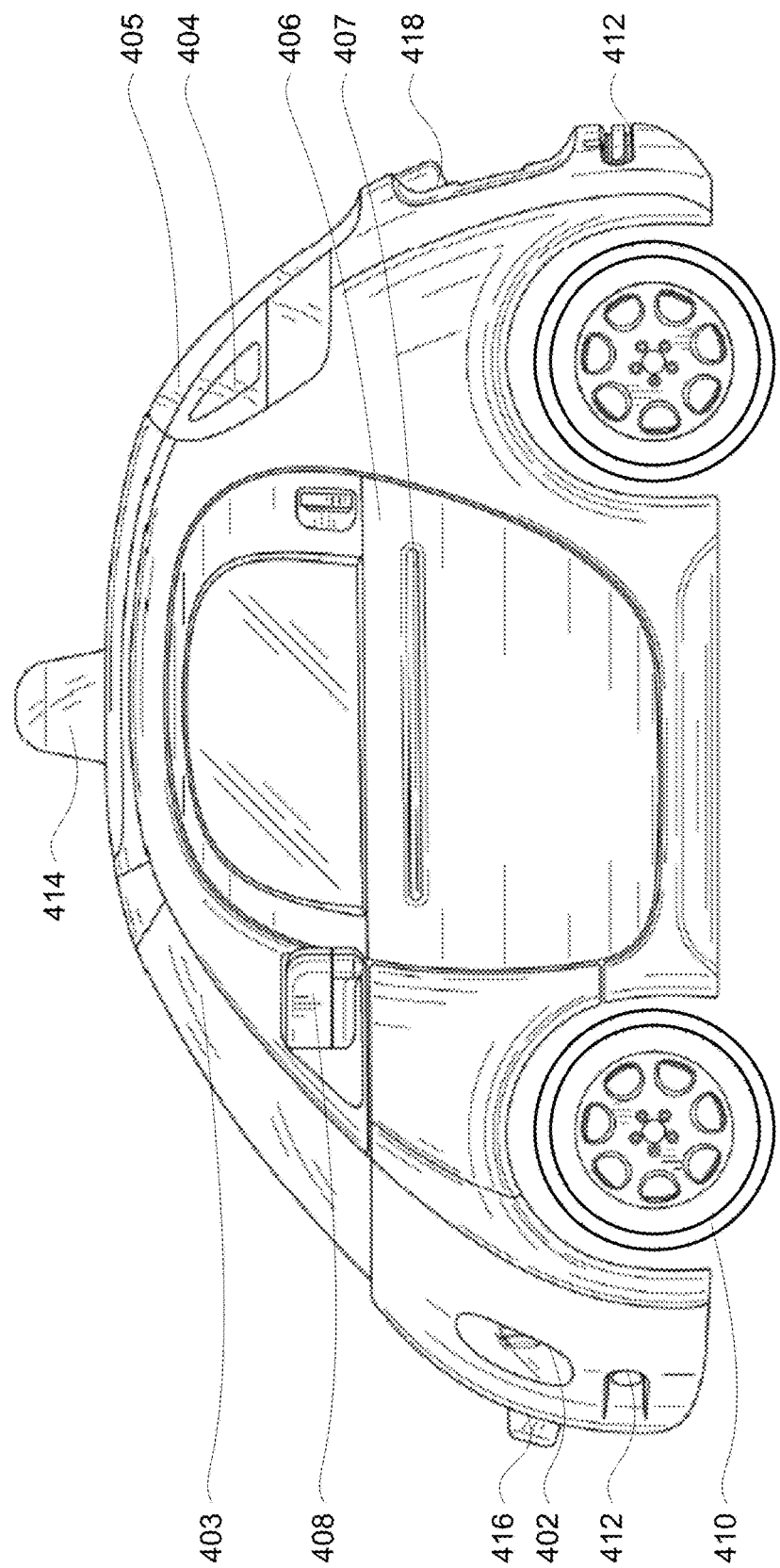
FIGS. 4A-4D are example external views of a vehicle in accordance with aspects of the disclosure.
Figure 4C:
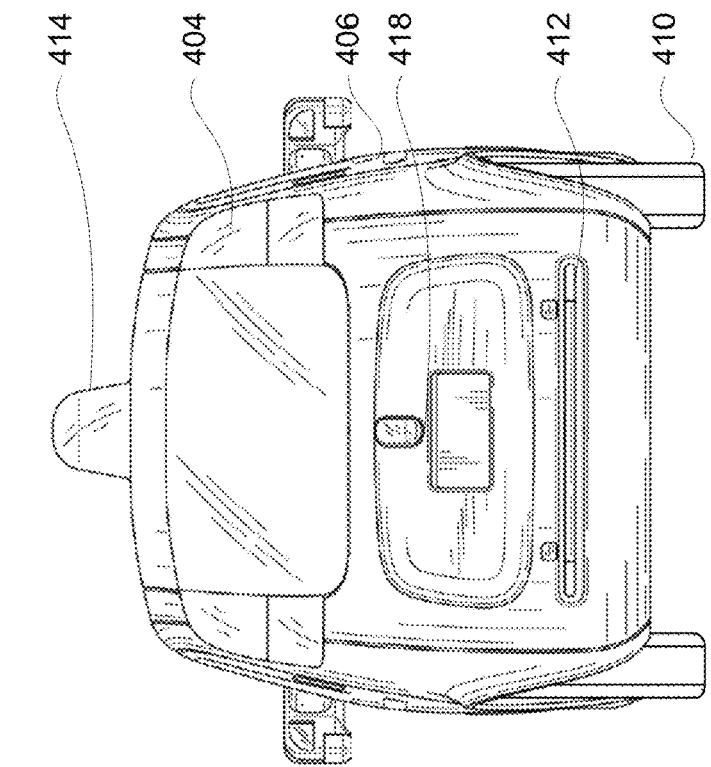
Figure 4B:
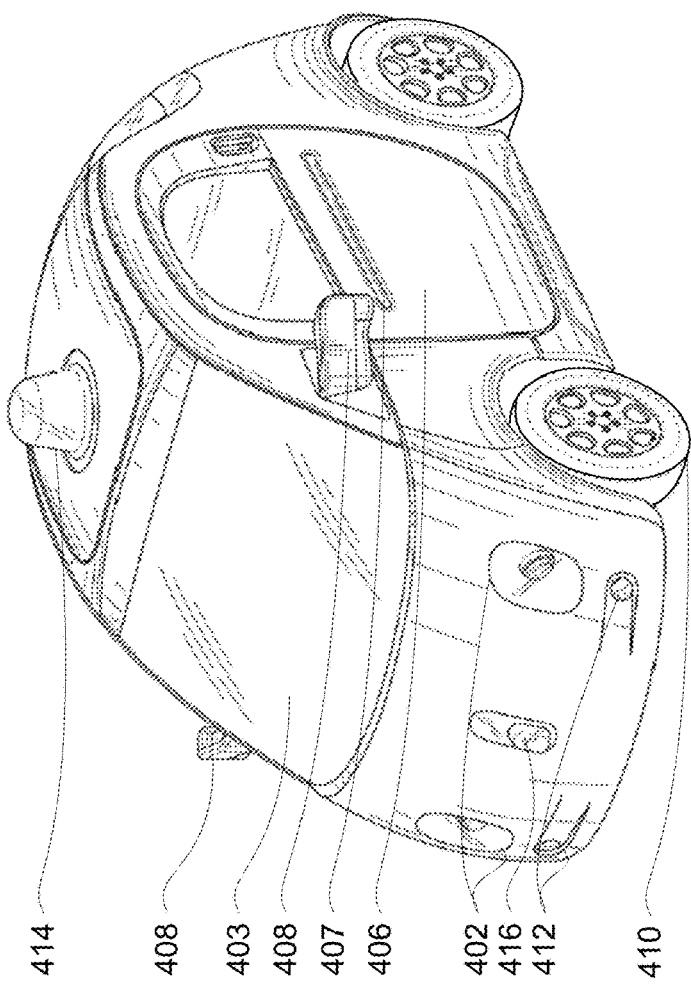
Figure 4D:
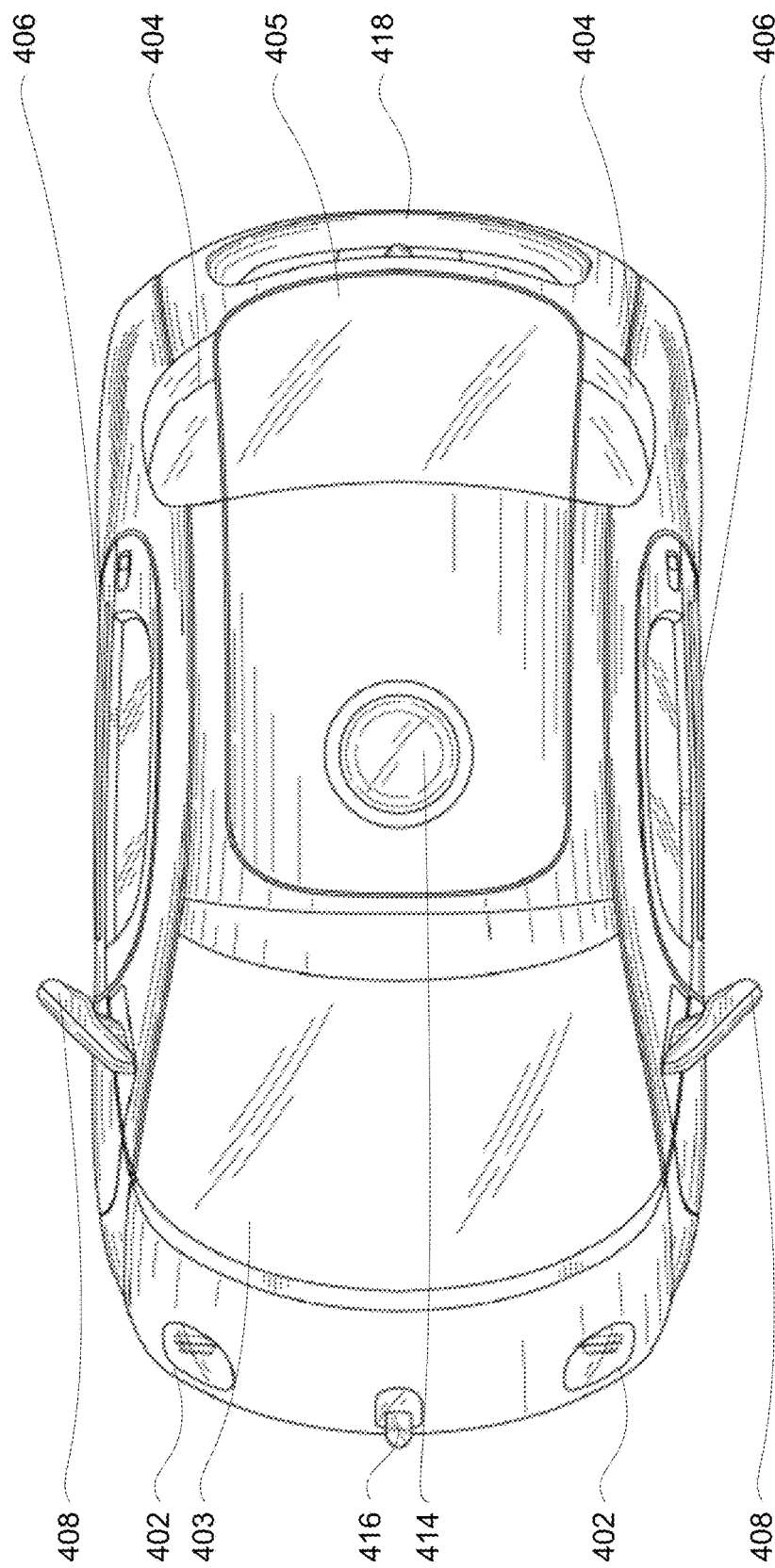

Computing device 110 of vehicle 100 may also receive or transfer information to and from other computing devices. FIGS. 2 and 3 are pictorial and functional diagrams, respectively, of an example system 200 that includes a plurality of computing devices 210, 220, 230, 240 and a storage system 250 connected via a network 260. System 200 also includes vehicle 100, and vehicle 100A which may be configured similarly to vehicle 100. Although only a few vehicles and computing devices are depicted for simplicity, a typical system may include significantly more.

As shown in FIG. 3, each of computing devices 210, 220, 230, 240 may include one or more processors, memory, data and instructions. Such processors, memories, data and instructions may be configured similarly to one or more processors 120, memory 130, data 132, and instructions 134 of computing device 110.

The network 260, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with computing device 110 of vehicle 100 or a similar computing device of vehicle 100A as well as computing devices 220, 230, 240 via the network 260. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 210 may use network 260 to transmit and present information to a user, such as user 222, 232, 242 on a display, such as displays 224, 234, 242 of computing devices 220, 230, 240. In this regard, computing devices 220, 230, 240 may be considered client computing devices.

As shown in FIG. 3, each client computing device 220, 230, 240 may be a personal computing device intended for use by a user 222, 232, 242, and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a projector, a television, or other device that is operable to display information), and user input devices 226, 236, 246 (e.g., a mouse, keyboard, touch-screen or microphone). The client computing devices may also include a camera for recording video streams, speakers, a network interface device, and all of the components used for connecting these elements to one another.

In addition, the client computing devices 220 and 230 may also include components 228 and 238 for determining the position and orientation of client computing devices. For example, these components may include a GPS receiver to determine the device's latitude, longitude and/or altitude as well as an accelerometer, gyroscope or another direction/speed detection device as described above with regard to positioning system 170 of vehicle 100.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system, or a netbook that is capable of obtaining information via the Internet or other networks. In another example, client computing device 230 may be a wearable computing system, shown as a head-mounted computing system in FIG. 2. As an example the user may input information using a small keyboard, a keypad, microphone, using visual signals with a camera, or a touch screen.

In some examples, client computing device 240 may be a concierge work station used by an administrator to provide concierge services to users such as users 222 and 232. For example, a concierge 242 may use the concierge work station 240 to communicate via a telephone call or audio connection with users through their respective client computing devices or vehicles 100 or 100A in order to facilitate the safe operation of vehicles 100 and 100A and the safety of the users as described in further detail below. Although only a single concierge work station 240 is shown in FIGS. 2 and 3, any number of such work stations may be included in a typical system.

Storage system 250 may store various types of information as described in more detail below. This information may be retrieved or otherwise accessed by a server computing device, such as one or more server computing devices 210, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 250 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

As with memory 130, storage system 250 can be of any type of computerized storage capable of storing information accessible by the server computing devices 210, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 150 may be connected to the computing devices via the network 260 as shown in FIG. 2 and/or may be directly connected to or incorporated into any of the computing devices 110, 210, 220, 230, 240, etc.

FIGS. 4A-4D are examples of external views of vehicle 100. As can be seen, vehicle 100 includes many features of a typical vehicle such as headlights 402, windshield 403, taillights/turn signal lights 404, rear windshield 405, doors 406, side view mirrors 408, tires and wheels 410, and turn signal/parking lights 412. Headlights 402, taillights/turn signal lights 404, and turn signal/parking lights 412 may be associated the signaling system 166. Light bar 407 may also be associated with the signaling system 166.

Vehicle 100 also includes sensors of the detection system 172. For example, housing 414 may include one or more laser devices for having 360 degree or narrower fields of view and one or more camera devices. Housings 416 and 418 may include, for example, one or more radar and/or sonar devices. The devices of the detection system may also be incorporated into the typical vehicle components, such as taillights 404 and/or side view mirrors 408. Each of these radar, camera, and lasers devices may be associated with processing components which process data from these devices as part of the detection system 172 and provide sensor data to the computing device 110.

Figure 5:
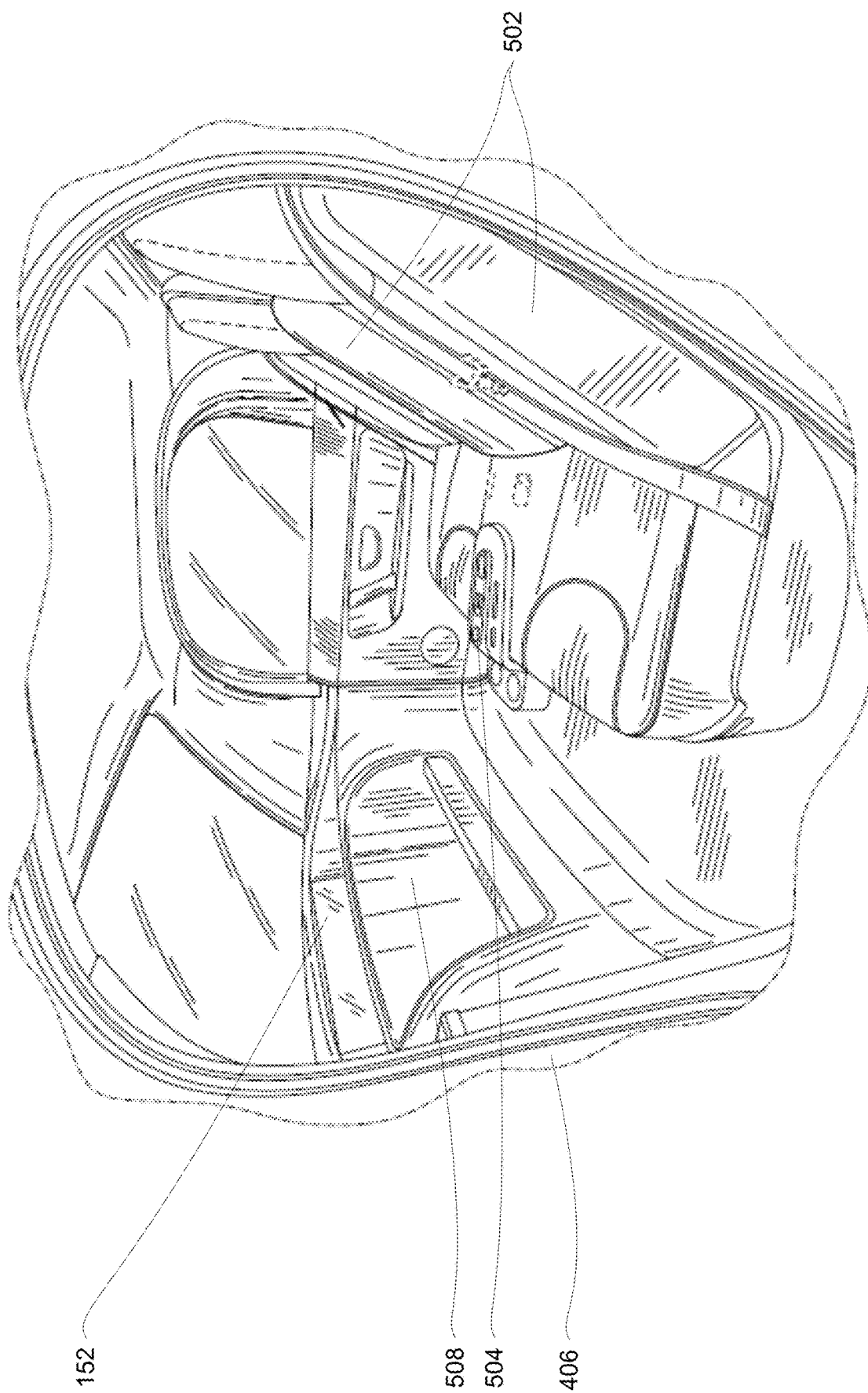
FIG. 5 is an example internal view of a vehicle in accordance with aspects of the disclosure.

FIG. 5 is an example internal view of vehicle 100 through the opening of door 406. In this example, there are two seats 502 for passengers with a console 504 between them. Directly in ahead of the seats 502 is a dashboard configuration 506 having a storage bin area 508 and the internal electronic display 152. As can be readily seen, vehicle 100 does not include a steering wheel, gas (acceleration) pedal, or brake (deceleration) pedal which would allow for a semiautonomous or manual driving mode where a passenger would directly control the steering, acceleration and/or deceleration of the vehicle via the drivetrain. Rather, as described in further detail below, user input is limited to a microphone of the user input 150 (not shown), features of the console 504, and wireless network connections 156. In this regard, internal electronic display 152 merely provides information to the passenger and need not include a touch screen or other interface for user input. In other embodiments, the internal electronic display 152 may include a touch screen or other user input device for entering information by a passenger such as a destination, etc.

Figure 6:
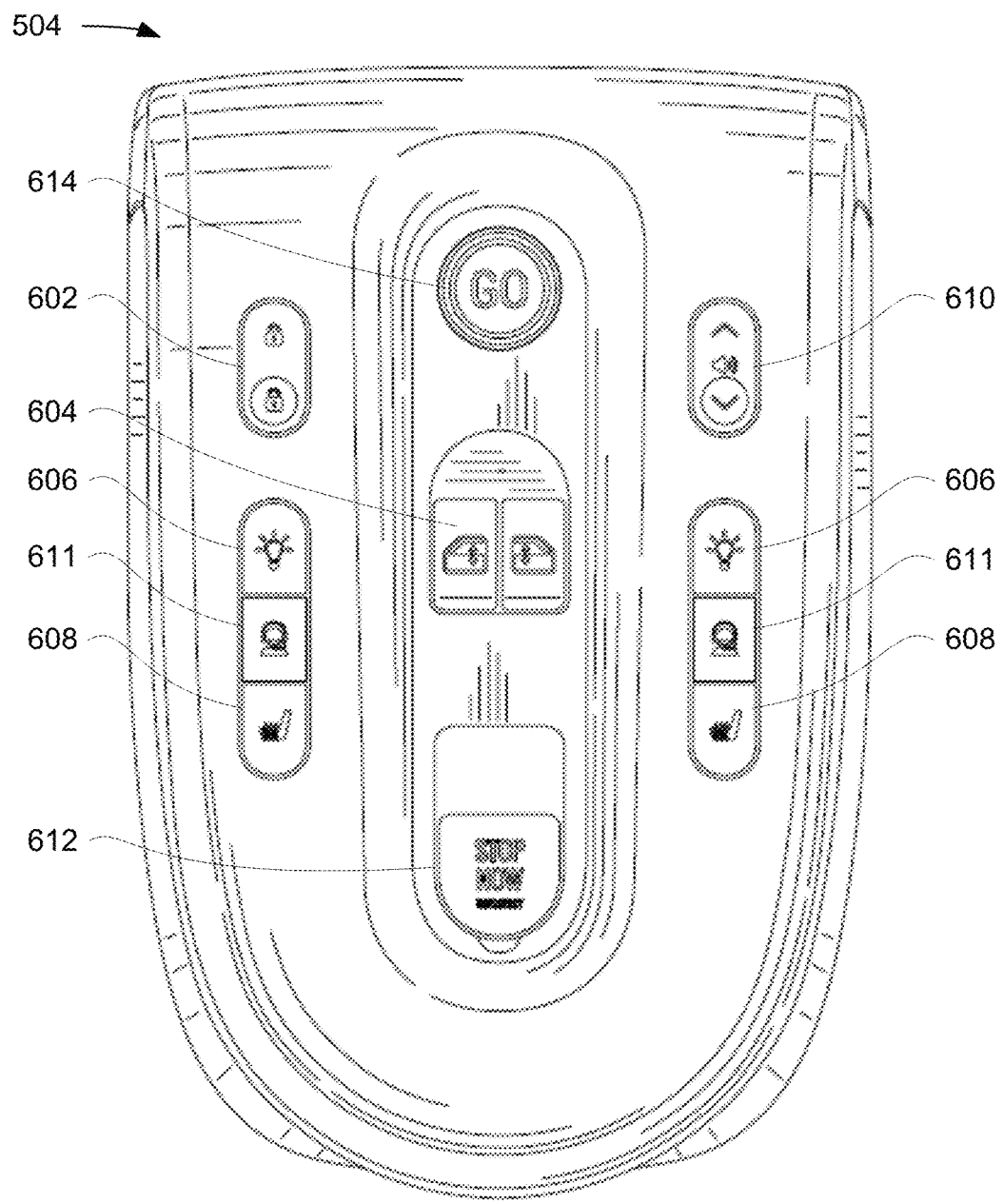
FIG. 6 is an example of a console of a vehicle in accordance with aspects of the disclosure.

FIG. 6 is a top down view of the console 504. Console 504 includes various buttons for controlling features of vehicle 100. For example, console 504 includes buttons that may be found in a typical vehicle such as buttons 602 for locking and unlocking the doors 406, buttons 604 for raising or lowering the windows of doors 406, buttons 606 for turning on internal lights of the vehicle, buttons 608 for controlling a heating function of seats 502, as well as buttons 610 for controlling the volume of speakers 154.

In addition, console 504 also includes buttons 611 for initiating communication with concierge 242 via one of the wireless network connections 156. Once the concierge work station is connected to the vehicle, the concierge may communicate with the passenger via the speakers 154 and/or internal electronic display 152. In addition, the microphone allows the passenger to speak directly to the concierge. In some cases, vehicle 100 may include an internal still or video camera that allows the concierge to view the status of the passengers and confirm their safety.

Buttons 612 and 614 may also be a part of user input 150 and in this regard, allow a passenger to communicate with computing device 110, for example, to initiate or end a trip in the vehicle. In this regard, button 612 may act as an emergency stopping button that, when pushed, causes vehicle 100 to stop in a short amount of time. Because the passenger does not have direct control of the acceleration or deceleration of vehicle 100 by way of a gas or brake pedal, button 612 may be an emergency stop button that is critical to allowing a passenger to feel safe and act quickly in case of an immediate emergency. In addition, because of the potentially abrupt nature of a stop initiated by the emergency stopping button 612, the emergency stopping button 612 may feature a cover (e.g., a clear plastic cover) that may have to be removed or flipped up in order to activate button 612.

Button 614 may be a multi-function button having different states. In the first state, button 614 may be a "GO" button which a passenger uses to initiate a trip to a destination. Once vehicle 100 is moving, button 614 may change to a "PULL OVER" button which a passenger users to initiate a non-emergency stop. In this regard, computing device 110 may respond by determining a safe place to pull the vehicle over, rather than coming to a more sudden stop as with the emergency stop button 612. Alternatively, two buttons, one having a "GO" state and the other having a "PULL OVER" state may be used.

Thus, passenger communication with computing device 110 for navigation purposes may be limited to button 614 (or two buttons as in the example above), emergency stopping button 612, wireless network connection 156 (such as Bluetooth LE) with the passenger's client computing device, and by sending information from the passenger's client computing device to the server 210 which then relays that information to the vehicle's computing device. In some examples, a passenger may provide information to the vehicle's computing device 110 via voice commands though the microphone as discussed above. In addition, however, the passenger may communicate with the concierge via a phone call, an application on the passenger's client computing device, a microphone, and/or the concierge button 611 and in turn, the concierge may provide instructions control certain aspects of a vehicle via a concierge work station.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 222 and 232 may download the application via a link in an email, directly from a website, or an application store to client computing devices 220 and 230. For example, client computing device may transmit a request for the application over the network, for example, to one or more server computing devices 210, and in response, receive the application. The application may be installed locally at the client computing device.

The user may then use his or her client computing device to access the application and request a vehicle. As an example, a user such as user 232 may use client computing device 230 to send a request to one or more server computing devices 210 for a vehicle. The request may include information identifying a pickup location or area and/or a destination location or area. As an example, such location may be identified by street addresses, location coordinates, points of interest, etc. In response the one or more server computing devices 210 may identify and dispatch, for example based on availability and location, a vehicle to the pickup location. This dispatching may involve sending information to the vehicle identifying the user (and/or the user's client device), the pickup location, and the destination location or area.

Figure 7:
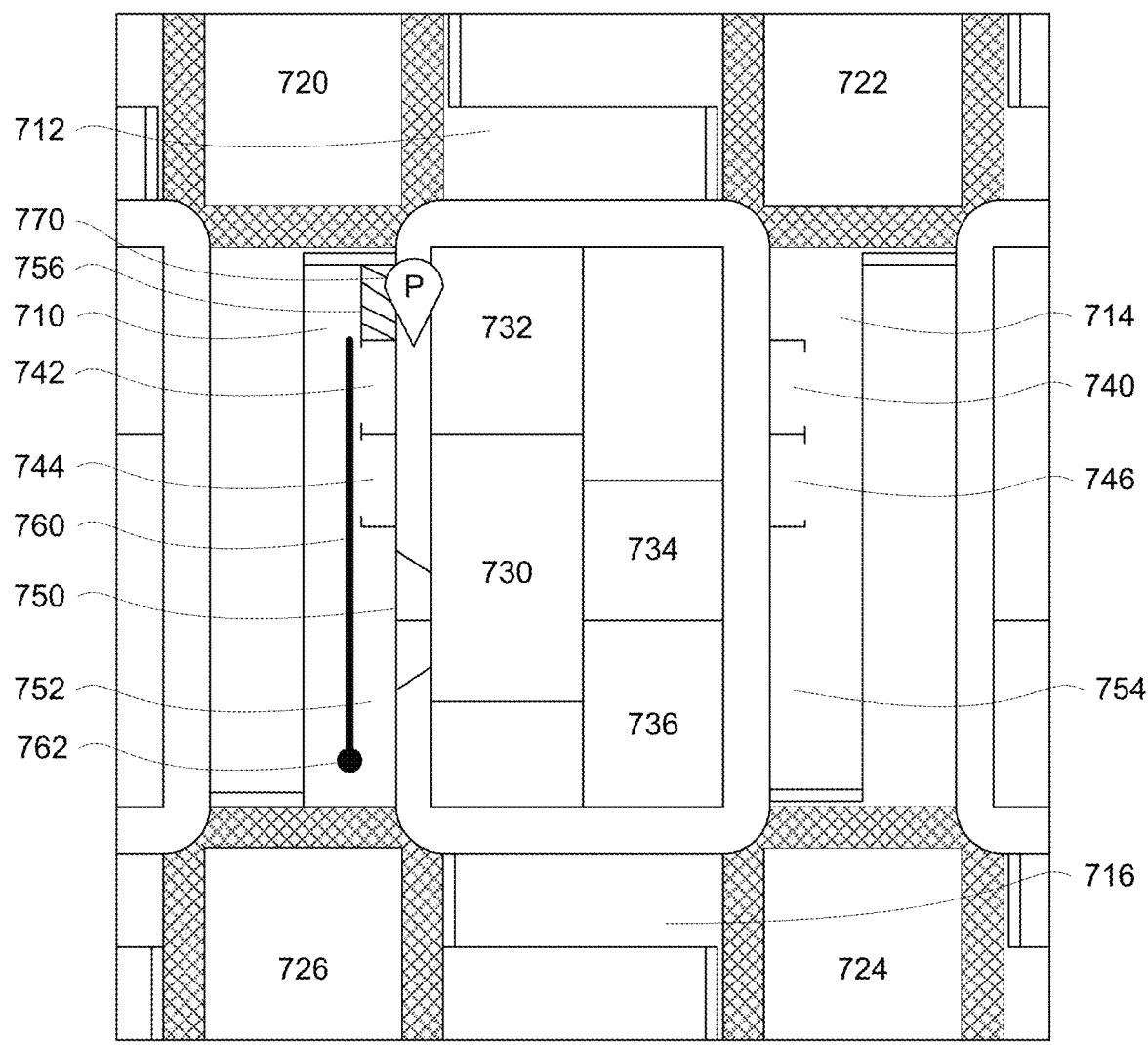
FIG. 7 is an example map in accordance with aspects of the disclosure.

FIG. 7 is an example of a map 700. In this example, the map includes a plurality of different features that identify the shape and location of various features such as lanes 710-716, intersections 720-726, buildings 730-736, parking spaces 740-746, a driveway entrance (for example to a parking garage or other location) 750, shoulder areas 752-754, and no parking zone 756. Together, these features correspond to a single city block. The map 700 may be a part of the detailed maps described above and used by the various computing devices of vehicle 100 in order to maneuver the vehicle 100.

Once the vehicle 100 receives the information dispatching the vehicle to the user from the server computing devices, the vehicle's computing device 110 may use the map 700 to identify the pickup location relative to the current location of the vehicle. For example, map 700 also includes a map pointer 770 corresponding to a pickup location P for user 232 and/or client device 230. The vehicle's computing device 110 may then maneuver the vehicle towards the pickup location using the various features described above.

Once the vehicle is within a threshold distance in time or space from or to the pickup location the vehicle's computing devices may attempt to look for an area in which the vehicle can stop and wait for the passenger. This distance may be, for example, along a route that the vehicle is currently following to reach the pickup location. In addition, the threshold distance may be defined as a distance before or after the vehicle has passed the pickup location.

The threshold distance may be defined in time, where the vehicle is estimated to reach the pickup location in 30 seconds or more or less, or in distance, where the vehicle is estimated to be 20 meters or more or less from the pickup location. Returning to FIG. 7, if the vehicle 100 were to approach the pickup location P from lane 710 (traveling away from intersection 726 and towards intersection 720), line 760 represents a threshold distance in time or space to location 762 to the pickup location P. In other words, when the vehicle 100 reaches the physical location of location 762 in map 700, the vehicle's computing device 110 may begin to look for a spot in which the vehicle can park.

Figure 8:
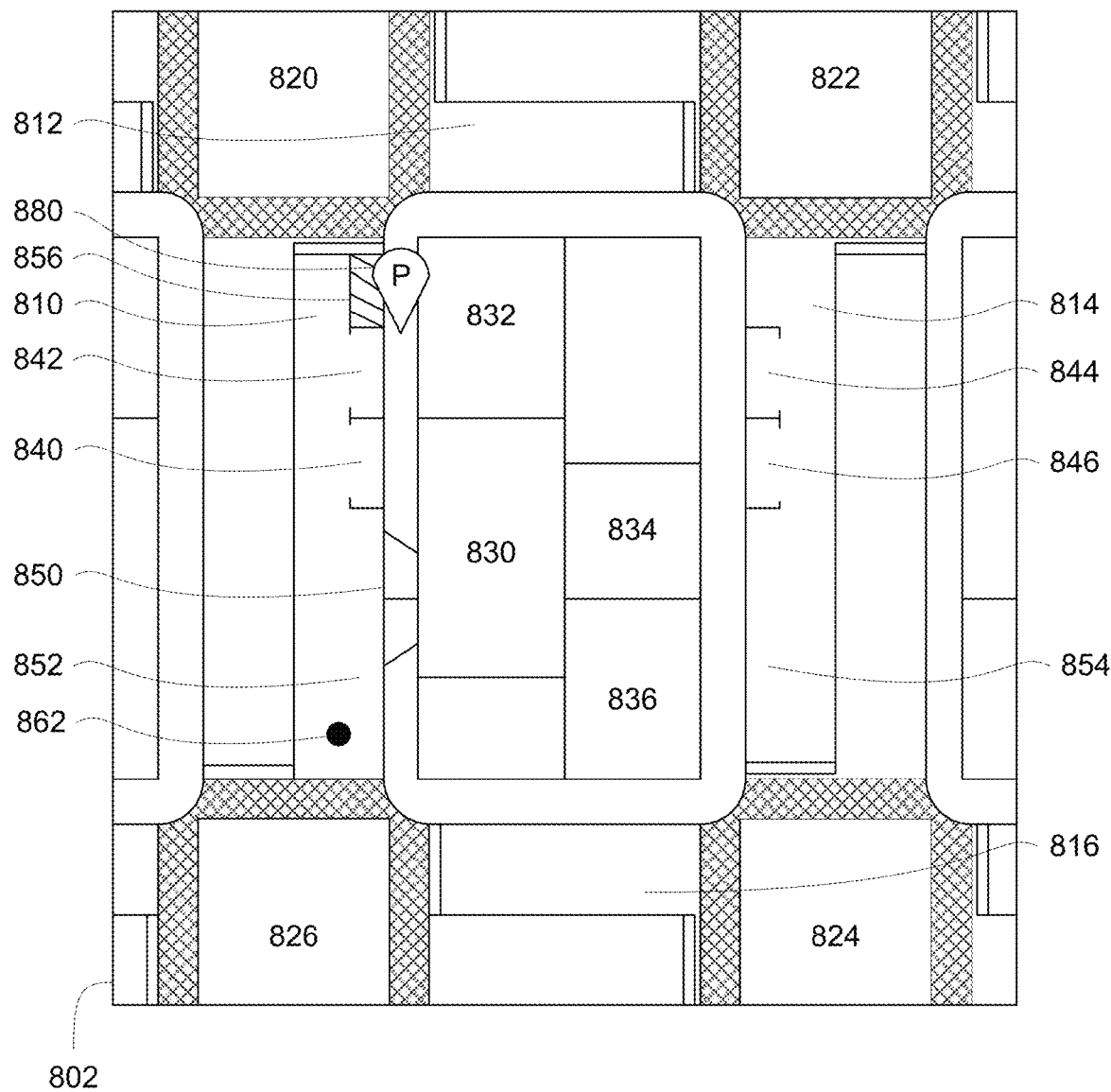
FIG. 8 is an example bird's eye view of a geographic area in accordance with aspects of the disclosure.

FIG. 8 is an example of a bird's eye view 800 of an geographic area 802 corresponding to the area of map 700. In this example, the geographical area includes various features such as lanes 810-816, intersections 820-826, buildings 830-836, parking spaces 840-846, a driveway entrance (for example to a parking garage or other location) 850, shoulder areas 852-854, and no parking zone 856 that correspond to each of lanes 710-716, intersections 720-726, buildings 730-736, parking spaces 740-746, a driveway entrance (for example to a parking garage or other location) 750, shoulder areas 752-754, and no parking zone 756 of the map 700. In this example, map pin 880 is for reference only and identifies the physical location of pickup location P. Similarly, point 862 is for reference only and identifies the physical location of location 762. Thus, once the vehicle 100 reaches point 862 in lane 810 (traveling away from intersection 826 and towards intersection 820), the vehicle's computing devices may begin to look for a spot in which the vehicle can stop.

Identifying an area in which a vehicle can park may be done in various ways. For example, the vehicle's computing device 110 may analyze sensor data from the vehicle's detection system 172 corresponding to geographic area 802 as well as the map 700 in order to identify an unoccupied area long and wide enough for the vehicle to maneuver out of a traffic lane and onto a shoulder or a designated parking spot. Thus, computing device 110 may identify shoulder 852 as well as parking spots 844 and 842 as possible locations where the vehicle can be stopped. In some examples, because the vehicle will likely not be waiting for a long period of time, the vehicle may stop in an area that is typically not designated for a vehicle to stop and wait, such as in front of a driveway, such as driveway 750 or no parking zone.

In some instances, the vehicle's computing device may not be able to identify an area in which the vehicle can park and wait for a user. For example, as shown in the example bird's eye view 900 of geographic area 802. In this example, vehicle 100 is shown passing location 862 in lane 710 approaching intersection 720. When vehicle 100 reaches location 862, the shoulder area 852 adjacent to lane 810 is occupied by a plurality of parking cones 950 which would prevent the vehicle 100 from stopping. In addition, parking spaces 844 and 846 (not shown) are occupied by vehicles 944 and 946. In addition, no parking zone 856 may not be available for safety reasons, such as being too close to the intersection 720 or being occupied by a pedestrian (not shown).

In yet other examples, various hazards may prevent the vehicle's computers from identifying an area in which the vehicle can park and wait for a user. Such hazards may be identified from the features of the detailed map and/or from the detection system 172. For example, the vehicle's various laser and camera sensors with a view of the ground next to the vehicle may be used to detect and identify hazards using any known computer vision and other object detection techniques. Examples of hazards may include pot holes, puddles, slippery ground, objects on top of the ground that would make for uneven footing, cracks in the pavement, uneven ground, high curbs, storm drains, broken glass, etc.

Figure 9:
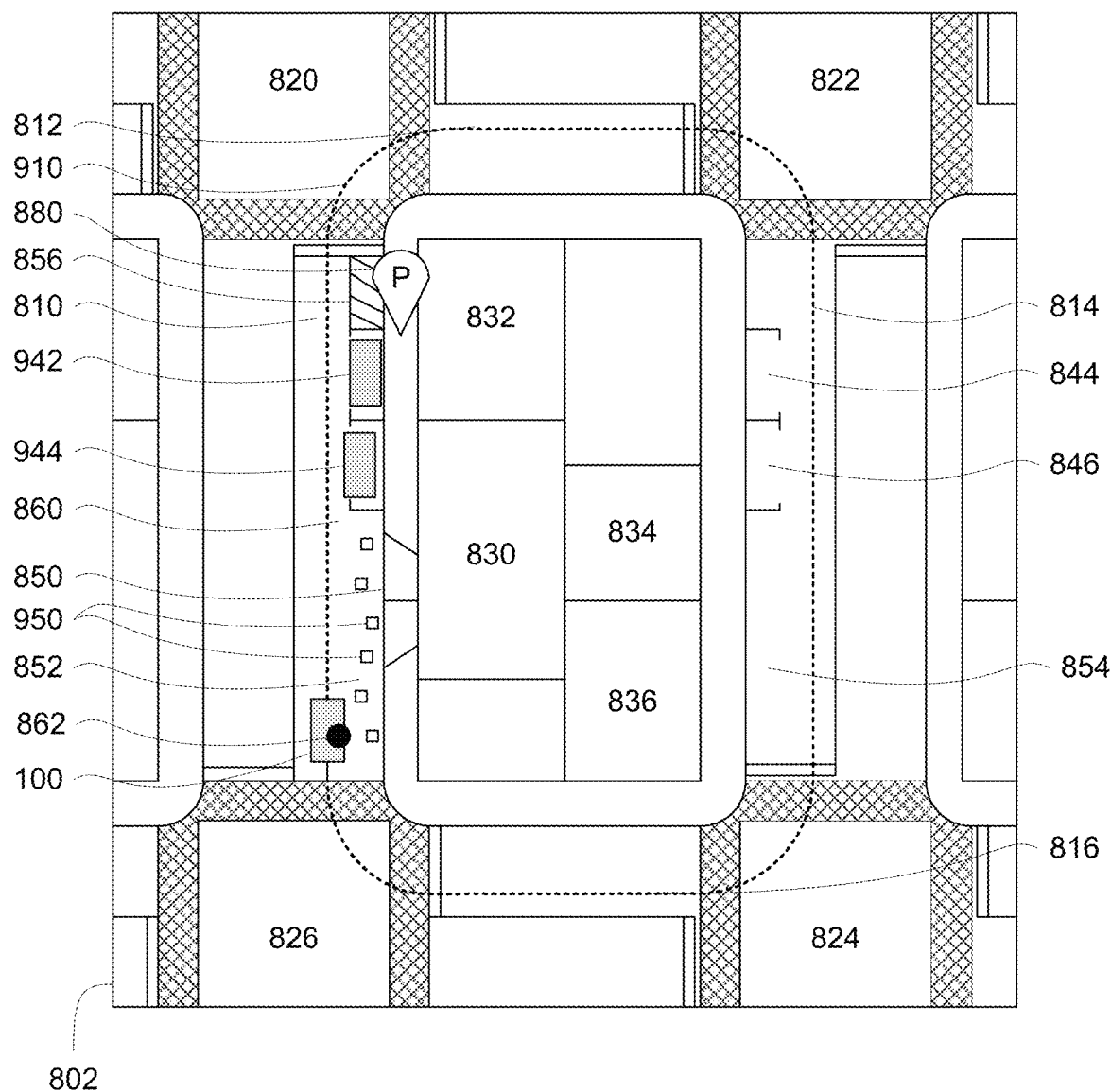
FIG. 9 is another example bird's eye view of a geographic area in accordance with aspects of the disclosure.

When the vehicle's computing device is unable to identify an area in which the vehicle can park and wait for a user, the vehicle's computing device may take various actions. In a first example for a pickup location, the vehicle may simply attempt to "drive around the block" and return to the pickup location a second time. In the example of FIG. 9, vehicle 100 may drive around the block by following path 910 or continuing in lane 810, making a right into lane 812 at intersection 820, making a right into lane 814 at intersection 822, making a right into lane 816 at intersection 824, making a right into lane 810 at intersection 826.

Once the vehicle is again within the threshold distance to the pickup location, the vehicle's computing device may again attempt to identify an area in which the vehicle can park and wait for a user. For example, when the vehicle 100 once again reaches the threshold distance in time or space to the pickup location P at location 862, the vehicle's computing device may make a second attempt to find a If this second attempt to find a spot is unsuccessful, the vehicle's computing devices may simply cancel the trip and notify the user's client computing device. The notifications provided may thus be initiated by the vehicle's computing device. In some examples, the notifications may be routed through the centralized dispatching system to the passenger's client computing device.

For example, in the example of FIG. 9, if one of vehicles 944 or 946 has moved since vehicle 100 was driven around the block, and spot 844 or 846 become available, the computing device may bring the vehicle to a stop in the available parking spot. However, if the spots remain occupied and the vehicle is unable to identify another suitable location, the vehicle's computing device may send a notification to the user's client computing device and/or the server computing devices to indicate that the trip has been cancelled as described above.

Alternatively, rather than driving around the block and making a second attempt as described above, after driving the vehicle around the block the vehicle may attempt to a stop at the pickup location for a brief period, such as 3 seconds or more or less, to see if the passenger can meet the vehicle.

Figure 10:
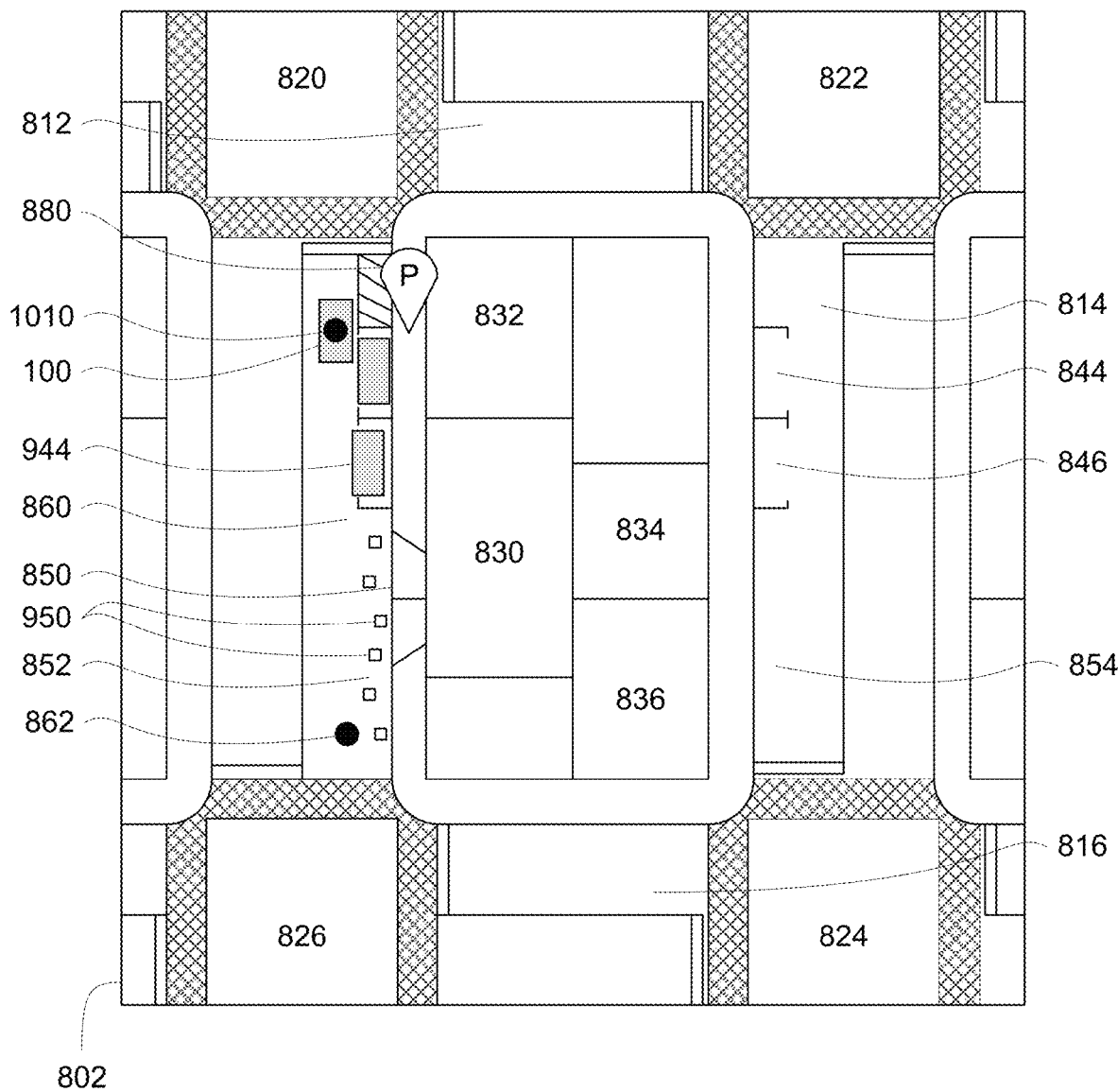
FIG. 10 is a further example bird's eye view of a geographic area in accordance with aspects of the disclosure.

As another alternative, during the second attempt if the vehicle's computing device is unable to find an area in which the vehicle can park and wait for a user, the vehicle may simply stop adjacent to the pickup location within a traffic lane. For example, FIG. 10 is another example bird's eye view 1000 of the geographic area 802. In this example, after vehicle 100 has been driven around the block by computing device 110, the computing device may stop the vehicle at location 1010 in the lane 810 to wait for the user. Because such stopping can be dangerous or inconvenient for other drivers, this more aggressive approach may be reserved for locations where stopping would be considered safe, such as in slower speed zones or where there is less traffic. Of course, should this stopping in a traffic lane become a safety issue, such as because the vehicle is blocking other vehicles that would want to continue towards intersection 820, etc., the computing device may move vehicle 100 out of the way and send a notification to the user's client computing device and/or the server computing devices to indicate that the trip has been cancelled.

In some examples, while the vehicle's computing devices are making a first and/or second attempt to find an area in which the vehicle can park and wait for a user, the vehicle's computing devices may also attempt to detect and authenticate the user's client computing device. This detection may be performed, for example, by using wireless communications protocols such as WiFi, Bluetooth, and other such wireless communication methods. Once a client computing device is detected, the authentication may be performed by exchanging authentication information, such as unique keys, etc.

When an attempt to detect and/or authentication a client computing device is unsuccessful on a first or second attempt, the vehicle's computing devices may use lack of authentication as a trigger to drive the vehicle around the block to make a second attempt to find an area in which the vehicle can park and wait for a user.

When an attempt to detect and/or authentication a client computing device is successful but the vehicle's computers are unable to find an area to park the vehicle, rather than driving around the block and making a second or third attempt to pull the vehicle over, the vehicle's computing device may simply stop the vehicle in the lane at the pickup location by double parking the vehicle as shown in the example of FIG. 10. In this case, the vehicle's computing device may also unlock the doors after a short period of time, such as 3 seconds or more or less, and wait for the user to enter the vehicle to start the trip to the destination location.

In addition, when an attempt to detect and/or authentication a client computing device is successful but the vehicle's computers are unable to find an area to park the vehicle, the vehicle's computing device may use the wireless connection with the client computing device to determine where to stop the vehicle in the lane. For example, the vehicle may include one or more directional antennas. By determining which directional antenna is receiving the strongest signal from the client computing device and the strength of that strongest signal, the vehicle's computing devices may determine on which side of the vehicle and how far away the client computing device is located from the vehicle. In this regard, when the vehicle is within a very short distance of the client computing device, such as a few meters or more or less, the vehicle's computing device may stop the vehicle within the lane. Again this case, the vehicle's computing device may also unlock the doors after a short period of time, such as 3 seconds or more or less, and wait for the user to enter the vehicle to start the trip to the destination location.

In another example, where the vehicle's computing device is unable to find an area in which the vehicle can park and wait for a user, rather than cancelling a trip, the vehicle may attempt to work with the user to conduct the pickup "on the fly." As an example, the vehicle's computing devices may be able to find a spot within some distance after passing the pickup location. Once stopped in a new pickup location, the vehicle's computing device may send a notification about the new location and asking the passenger if he or she is willing to walk to the vehicle and thus, complete the pickup in this manner.

Figure 11:
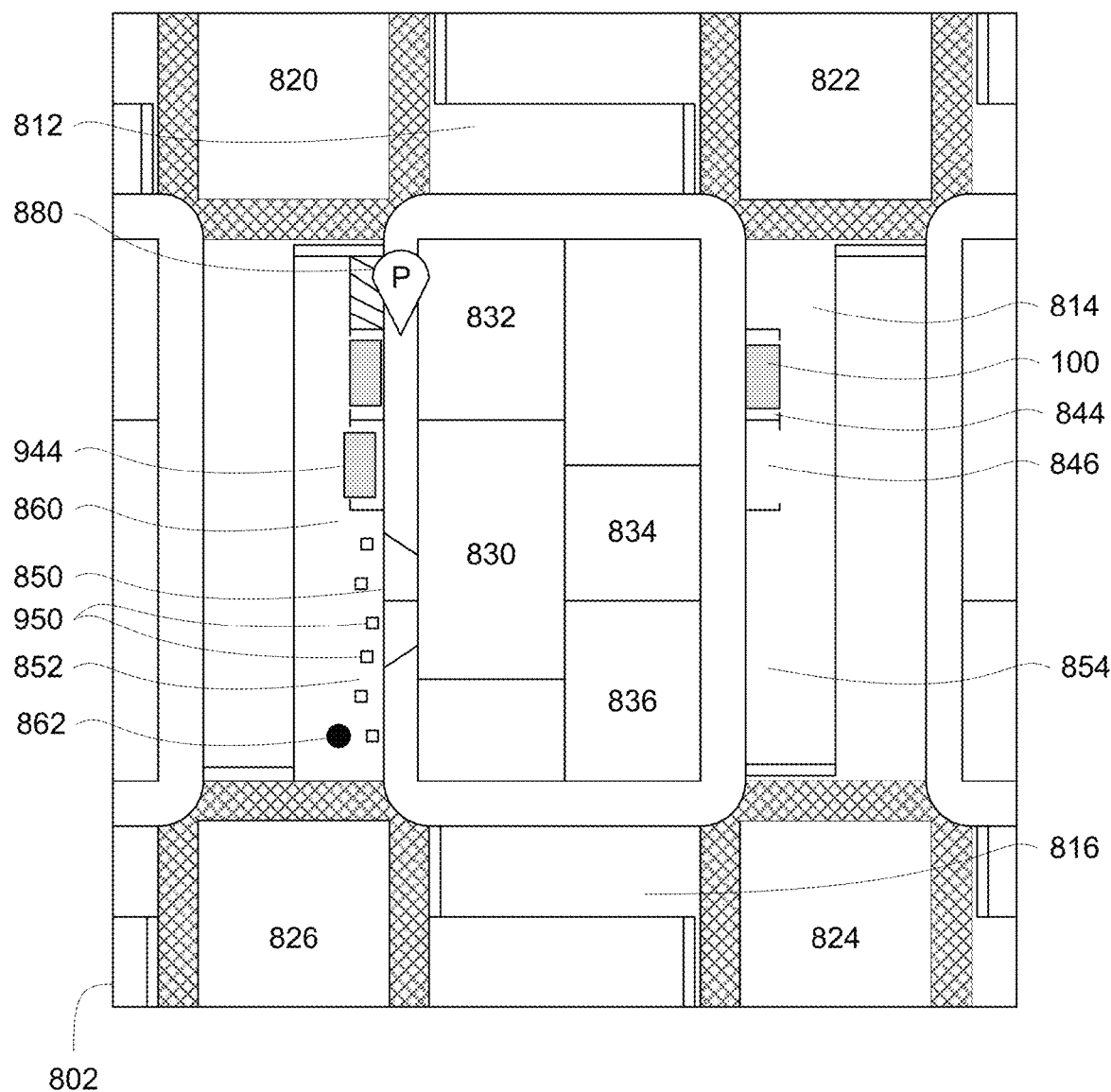
FIG. 11 is an example bird's eye view of a geographic area in accordance with aspects of the disclosure.

FIG. 11 is an example bird's eye view 1100 of geographic area 802. In this example, after passing the pickup location P on a first or second attempt, the vehicle's computing device has determined that the area of parking spot 844 is available. Thus, computing device 110 has stopped vehicle 100 in parking spot 844 in order to wait for the user. At this point, the vehicle's computer may send a notification to the user's client device notifying the user of the new pickup location and asking the user to confirm whether the user is will and/or able to meet the vehicle at the location of parking spot 844. Using his or her client computing device, the user may respond to indicate whether or not the user will reach the new pickup location. If so, the vehicle may continue to wait for the user, and if not, the vehicle may send a notification cancelling the trip as described above.

In another example, when the vehicle is making a first or a second attempt but is unable to find an area in which the vehicle can park and wait for a user, the vehicle's computing devices may send a notification to the passenger asking if the passenger is willing to enter the vehicle quickly while the vehicle is stopped in a traffic lane as shown in FIG. 10. Again, if so, the vehicle and passenger may complete the pickup in this manner.

In yet another example, if a hazard is detected in an area where the vehicle could otherwise be stopped, the vehicle's computing device could send a notification to notify the user of the hazard before or after stopping. This notification could also include a request that the user confirm whether he or she would like to select an alternate pickup (or drop off location). Again, the user may then respond to the notification via his or her client computing device and confirm whether the user would like to select an alternate pickup (or drop off location).

The features discussed above with regard to making attempts to find an area in which the vehicle can park and wait for a user may also be used to implement a drop off of a user, now a passenger, at a destination location. However, as noted above, because less time is likely to be needed for a user to exit the vehicle than to enter and begin a trip, the vehicle's computing devices may be more aggressive when attempting to find a spot or stop the vehicle in a traffic lane. This may reduce the passenger's stress at having to watch the vehicle pass the destination and drive around the block to make a second attempt before dropping off the passenger at the destination.

Figure 12:
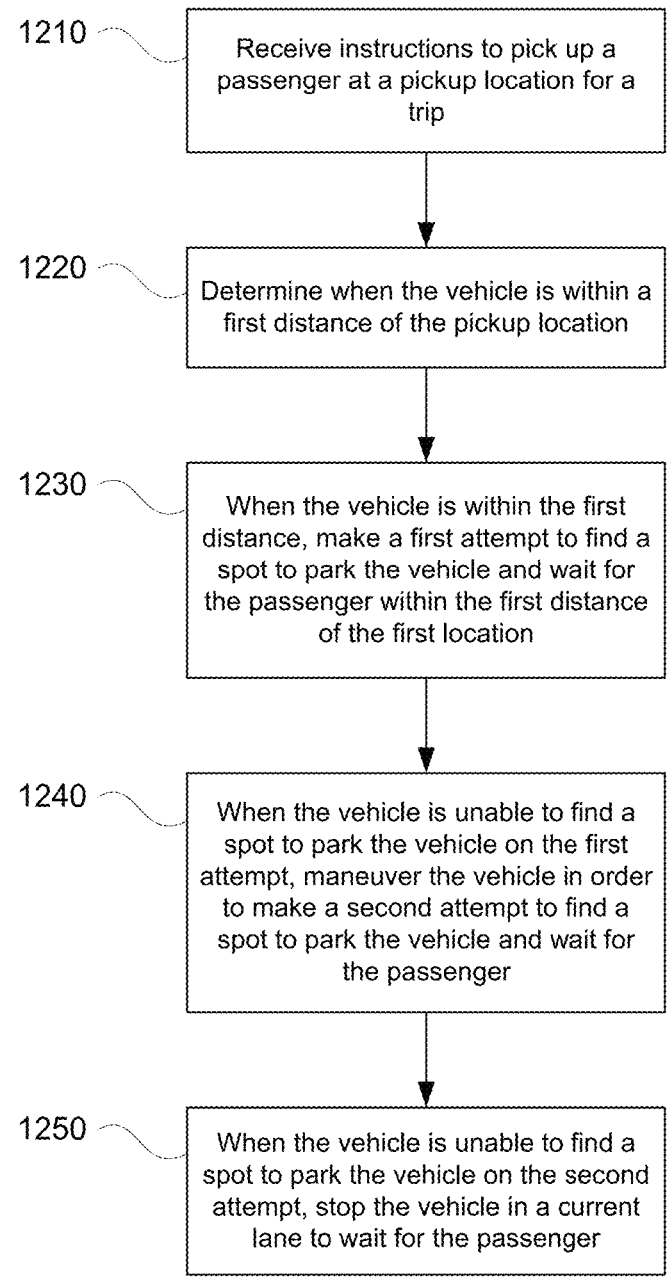
FIG. 12 is an example flow diagram in accordance with aspects of the disclosure.

FIG. 12 is an example flow diagram 1200 in accordance with some of the aspects described above that may be performed by one or more computing devices such as server computing devices 110. In this example, instructions to pick up a passenger at a pickup location for a trip are received at block 1210. When the vehicle is within a first distance of the pickup location is determined at block 1220. When the vehicle is within the first distance, a first attempt to find a spot to park the vehicle and wait for the passenger within the first distance of the first location is made at block 1230. When the vehicle is unable to find a spot to park the vehicle on the first attempt, the vehicle is maneuvered in order to make a second attempt to find a spot to park the vehicle and wait for the passenger at block 1240. When the vehicle is unable to find a spot to park the vehicle on the second attempt, the vehicle is stopped in a current lane to wait for the passenger at block 1250.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
    receiving, by one or more computing devices, instructions to pick up a passenger at a pickup location for a trip;
    determining, by the one or more computing devices, whether a vehicle having an autonomous driving mode is within a predetermined distance of the pickup location;
    when the vehicle is determined to be within the predetermined distance, making a first attempt, by the one or more computing devices, to find a parking spot outside of any traffic lane to park the vehicle; and
    when the first attempt fails:
        sending, by the one or more computing devices, at least one notification to a client computing device associated with the passenger, wherein the at least one notification indicates that the vehicle is unable to find the parking spot and that the vehicle will stop at an identified location to wait for the passenger, where the identified location is in a traffic lane;
        maneuvering, by the one or more computing devices, the vehicle in the autonomous driving mode to the identified location; and
        after maneuvering the vehicle, stopping, by the one or more computing devices, the vehicle at the identified location and wait for the passenger.

2. The method of claim 1, wherein the at least one notification further requests confirmation that the passenger would like to enter the vehicle while the vehicle is stopped in the traffic lane.

3. The method of claim 1, further comprising, after failing to make the first attempt and before sending the at least one notification:
    controlling the vehicle in order to pass by the pickup location and thereafter maneuver towards the pickup location; and
    after controlling the vehicle, making a second attempt, by the one or more computing devices, to find the parking spot.

4. The method of claim 1, wherein the vehicle is stopped after the at least one notification is sent.

5. The method of claim 1, wherein the vehicle is stopped before the at least one notification is sent.

6. The method of claim 5, wherein the at least one notification further requests that the passenger confirm whether the passenger will meet the vehicle at the identified location.

7. The method of claim 1, further comprising:
receiving confirmation that the passenger will meet the vehicle at the identified location; and
based on the confirmation, continuing to wait at the identified location until the passenger enters the vehicle.

8. The method of claim 1, wherein the identified location is within a predetermined distance beyond the pickup location.

9. The method of claim 1, wherein making the first attempt includes attempting to identifying areas to stop the vehicle including areas not designated as parking spots in map information stored locally at the vehicle.

10. The method of claim 1, wherein making the first attempt includes identifying a parking spot defined in map information in map information stored locally at the vehicle as occupied by an object based on the sensor data.

11. The method of claim 1, wherein making the first attempt includes identifying a parking spot defined in map information in map information stored locally at the vehicle as occupied by a hazard based on the sensor data.

12. A system comprising one or more computing devices configured to:
receive instructions to pick up a passenger at a pickup location for a trip;
determine whether a vehicle having an autonomous driving mode is within a predetermined distance of the pickup location;
when the vehicle is determined to be within the predetermined distance, make a first attempt to find a parking spot outside of any traffic lanes to park the vehicle; and
when the first attempt fails:
send at least one notification to a client computing device associated with the passenger, wherein the at least one notification indicates that the vehicle is unable to find the parking spot and that the vehicle will stop at an identified location to wait for the passenger, wherein the identified location is in a traffic lane;
maneuver the vehicle in the autonomous driving mode to the identified location; and
after maneuvering the vehicle, stop the vehicle at the identified location and wait for the passenger.

13. The system of claim 12, wherein the at least one notification further requests confirmation that the passenger would like to enter the vehicle while the vehicle is stopped in the traffic lane.

14. The system of claim 12, wherein the one or more computing devices are configured to stop the vehicle after the at least one notification is sent.

15. The system of claim 12, wherein the one or more computing devices are configured to stop the vehicle before the at least one notification is sent.

16. The system of claim 12, wherein the one or more computing devices are further configured to:
receive confirmation that the passenger will meet the vehicle at the identified location; and
based on the confirmation, continue to wait at the identified location until the passenger enters the vehicle.

17. A vehicle having an autonomous mode, the vehicle comprising:
memory; and
one or more computing devices configured to:
receive instructions to pick up a passenger at a pickup location for a trip;
determine whether the vehicle is within a predetermined distance of the pickup location;
when the vehicle is determined to be within the predetermined distance, make a first attempt to find a parking spot outside of any traffic lanes to park the vehicle; and
when the first attempt fails:
send at least one notification to a client computing device associated with the passenger, wherein the at least one notification indicates that the vehicle is unable to find the parking spot and that the vehicle will stop at an identified location to wait for the passenger, wherein the identified location is in a traffic lane;
maneuver the vehicle in the autonomous driving mode to the identified location; and
after maneuvering the vehicle, stop the vehicle at the identified location and wait for the passenger.

18. The vehicle of claim 17, wherein the at least one notification further requests confirmation that the passenger would like to enter the vehicle while the vehicle is stopped in the traffic lane.

19. The vehicle of claim 17, wherein the one or more computing devices are configured to stop the vehicle after the at least one notification is sent.

20. The vehicle of claim 17, wherein the one or more computing devices are configured to stop the vehicle before the at least one notification is sent.

* * * * *

UNITED STATES PATENT AND TRADEMARK OFFICE
CERTIFICATE OF CORRECTION

| | |
|---|---|
| PATENT NO. | : 11,747,811 B1 |
| APPLICATION NO. | : 16/290253 |
| DATED | : September 5, 2023 |
| INVENTOR(S) | : Cullinane et al. |

It is certified that error appears in the above-identified patent and that said Letters Patent is hereby corrected as shown below:

In the Claims

Column 17
Claim 10, Line 17:
Now reads: "the sensor data"; should read: -- sensor data --

Claim 11, Line 21:
Now reads: "the sensor data"; should read: -- sensor data --

Column 18
Claim 17, Line 13:
Now reads: "an autonomous mode,"; should read: -- an autonomous driving mode, --

Signed and Sealed this
Seventeenth Day of October, 2023

*Katherine Kelly Vidal*

Katherine Kelly Vidal
*Director of the United States Patent and Trademark Office*